United States Patent
Nagai et al.

(10) Patent No.: US 7,115,705 B2
(45) Date of Patent: Oct. 3, 2006

(54) METHOD OF PRODUCING A POLYTHIOURETHANE AND METHOD OF PRODUCING A GRAFT POLYMER

(75) Inventors: Atsushi Nagai, Yonezawa (JP); Bungo Ochiai, Yonezawa (JP); Takeshi Endo, Yokohama (JP)

(73) Assignee: JSR Corporation, Tokyo (JP)

( * ) Notice: Subject to any disclaimer, the term of this patent is extended or adjusted under 35 U.S.C. 154(b) by 90 days.

(21) Appl. No.: 10/981,594

(22) Filed: Nov. 5, 2004

(65) Prior Publication Data

US 2005/0250926 A1 Nov. 10, 2005

(30) Foreign Application Priority Data

May 6, 2004 (JP) .............................. 2004-137712

(51) Int. Cl.
*C08G 75/00* (2006.01)
(52) U.S. Cl. ........................... 528/390; 525/72; 525/73
(58) Field of Classification Search ................ 528/380; 525/72, 73
See application file for complete search history.

(56) References Cited

FOREIGN PATENT DOCUMENTS

JP 2004099479 * 4/2004

OTHER PUBLICATIONS

Nagai, Atshushi et al., "Chem Comm," No. 24, Dec. 21, 2003, pp. 3018-3019.
Nagai, Atshushi et al., "Macromolecules," vol. 37, No. 20, Aug. 31, 2004, pp. 7538-7542.
Nagai, Atshushi et al., "Macromolecules," vol. 37, No. 12, May 14, 2004, pp. 4417-4421.

* cited by examiner

*Primary Examiner*—Rachel Gorr
(74) *Attorney, Agent, or Firm*—Oblon, Spivak, McClelland, Maier & Neustadt, P.C.

(57) ABSTRACT

A polythiourethane is produced by polymerizing a compound represented by formula (I) in the presence of a compound represented by formula (II)

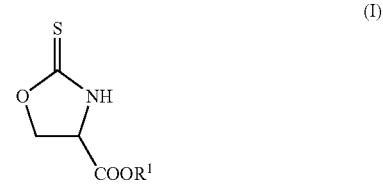

in which $R^1$ represents a methyl group;

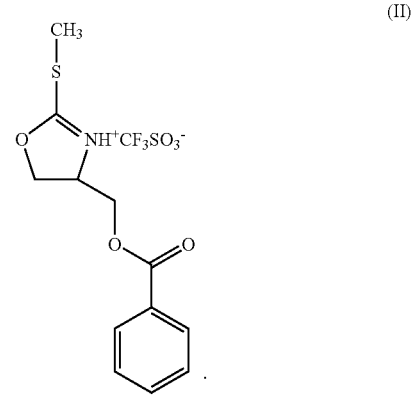

17 Claims, 12 Drawing Sheets

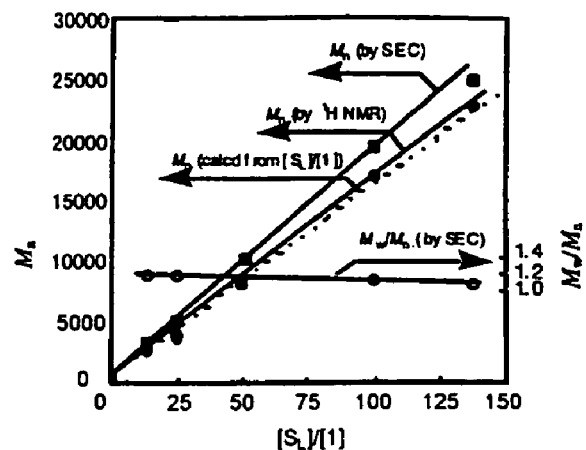
Fig. 1 $M_n$ and $M_w/M_n$ vs feed ratio ([$S_L$]/[I]).
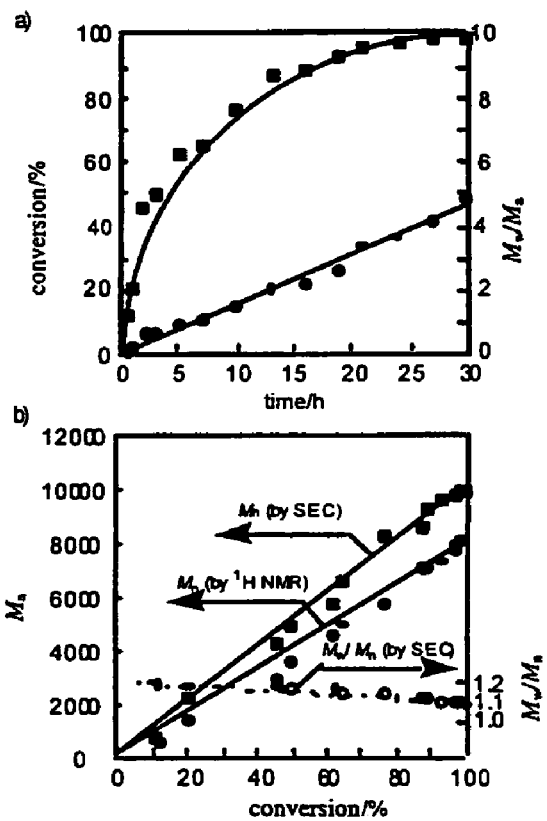
Fig. 2 (a) Time-conversion and first-order time-conversion plots for the polymerization of $S_L$ with 1 in $CH_2Cl_2$ at 30 °C under air. (b) Conversion-$M_n$ and conversion-$M_w/M_n$ plots in the polymerization of $S_L$ with 1 in $CH_2Cl_2$ at 30 °C under air; [1]$_0$ = 0.01 M, [$S_L$]$_0$ / [1]$_0$ = 50.

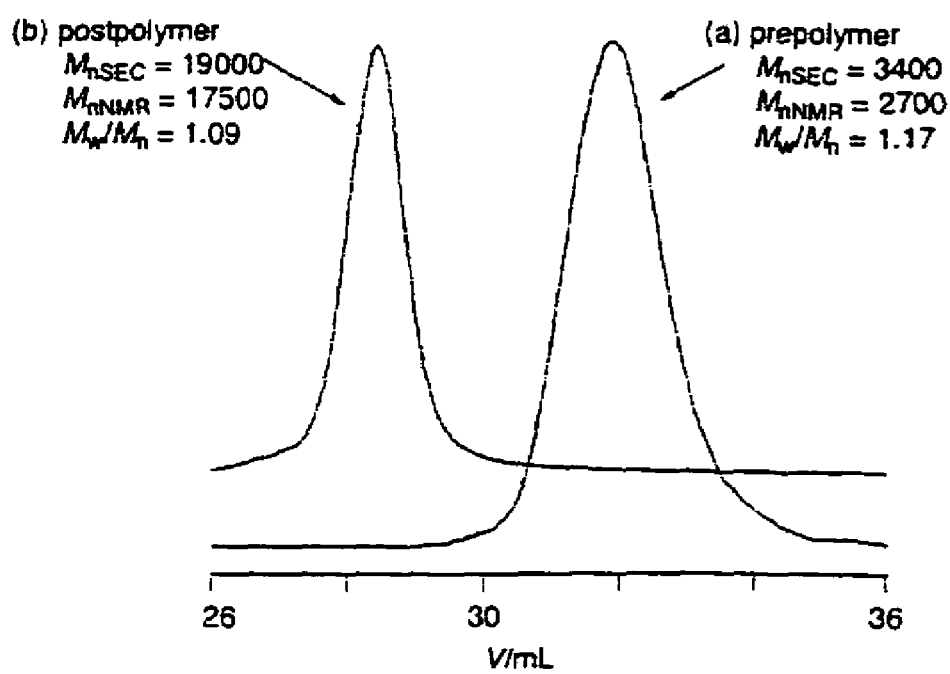
Fig. 3 SEC profiles before and after the post-polymerization experiment on $S_L$. Poly$S_L$: prepolymer obtained in the first-stage polymerization, $M_{n\,SEC}$ = 3400, $M_{n\,NMR}$ = 2700, $M_w/M_n$ = 1.17. Poly($S_L$-$p$-$S_L$): postpolymer obtained in the second stage polymerization. $M_{n\,SEC}$ = 19000, $M_{n\,NMR}$ = 17500, $M_w/M_n$ = 1.09.

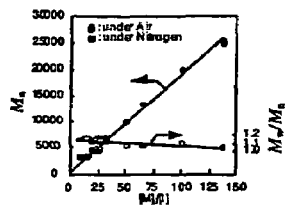
Fig. 4 Living cationic polymerization of a cyclic thiourethane under air and water was achieved using well-defined water-resistant cationic initiator in non-distilled $CH_2Cl_2$ at mild temperature.
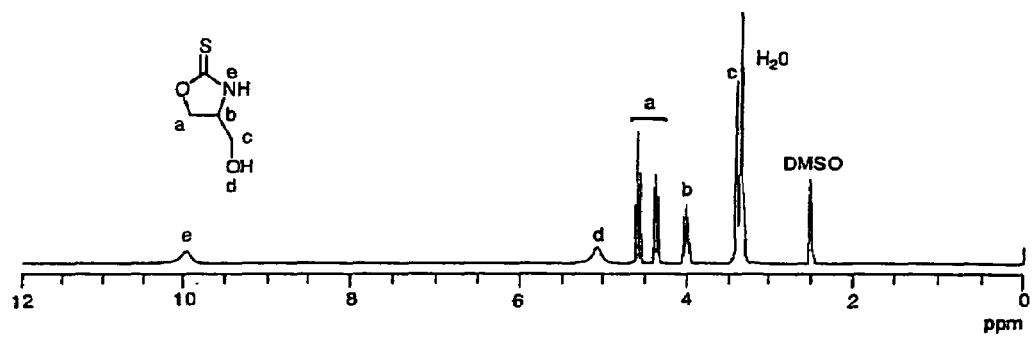
Fig. 5 $^1$H NMR spectra of 4-hydroxymethyl-1,3-oxazolidine-2-thione.
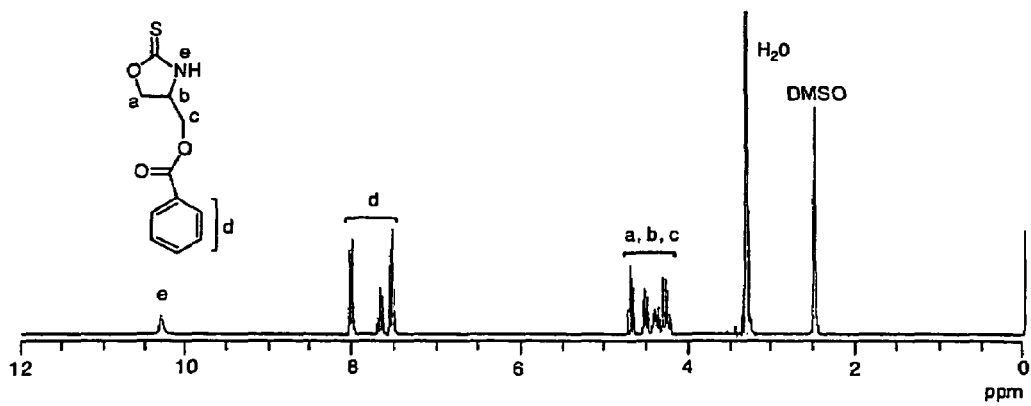
Fig. 6 $^1$H NMR spectra of benzoic acid 2-thioxo-oxazolidin-4-ylmethyl ester.

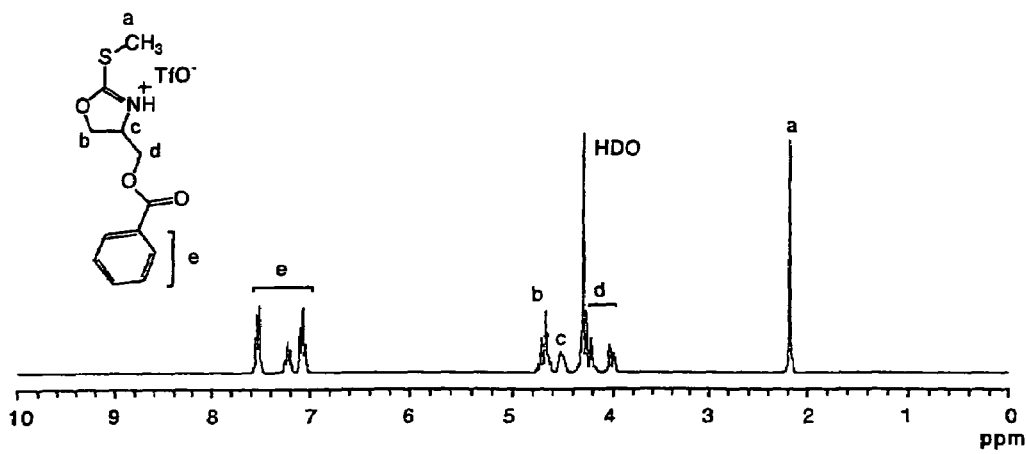
Fig. 7 $^1$H NMR spectra of benzoic acid 2-methylsulfanyl-4,5-dihydro-oxazolinium-4-ylmethyl ester trifluoromethanesulfonate 1 in $D_2O$.
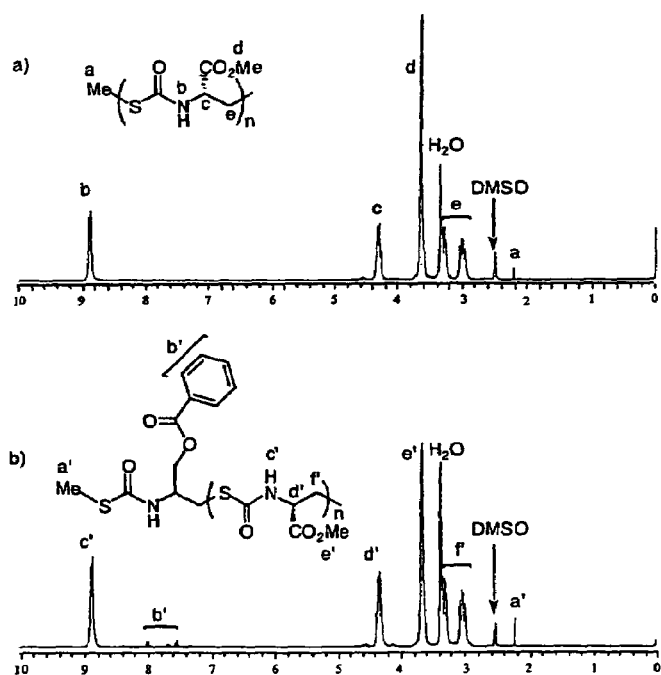
Fig. 8 $^1$H NMR spectra of a) polymer obtained under dry nitorogen atmosphere ($M_n$ = 19540) and b) polymer obtained under air ($M_n$ = 19605).

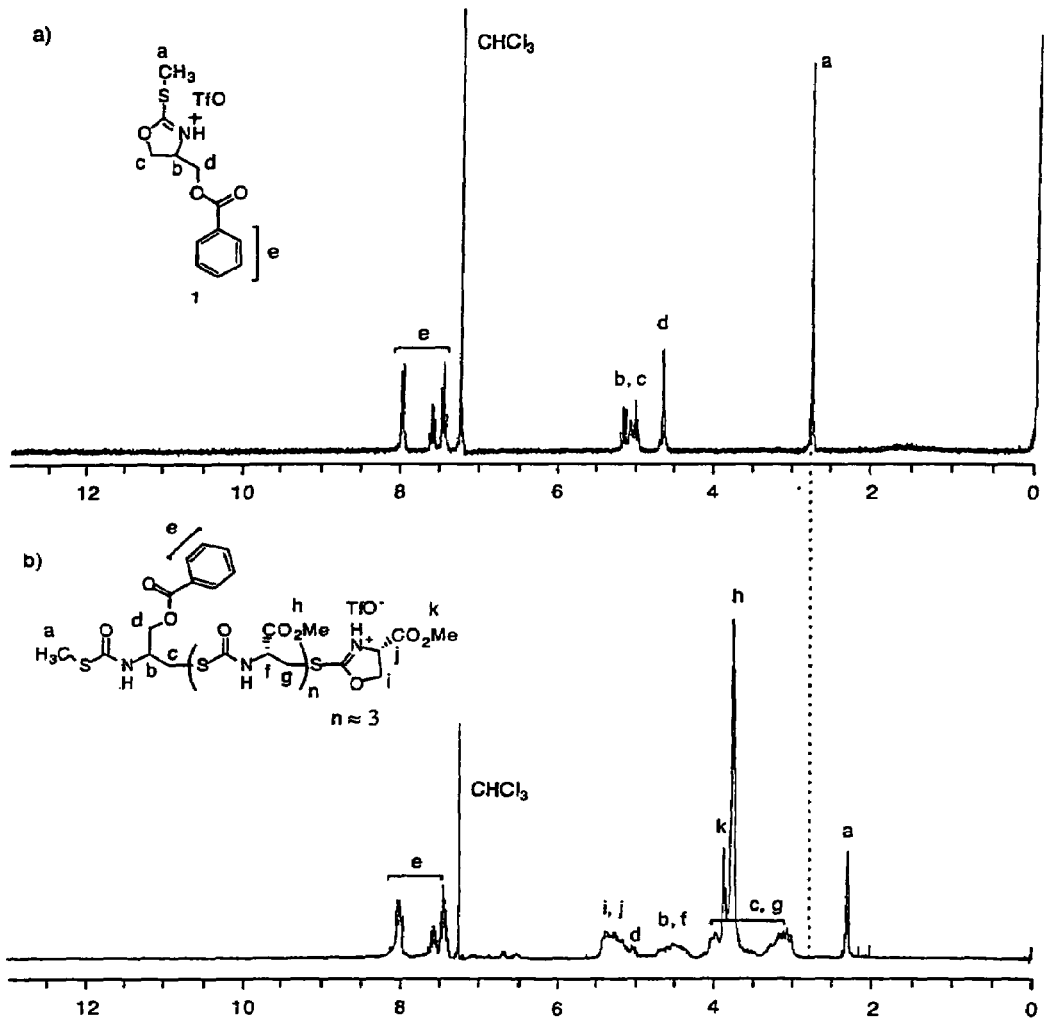
Fig. 9 $^1$H NMR spectra of a) 1 and b) the mixture of 1 and $S_L$.

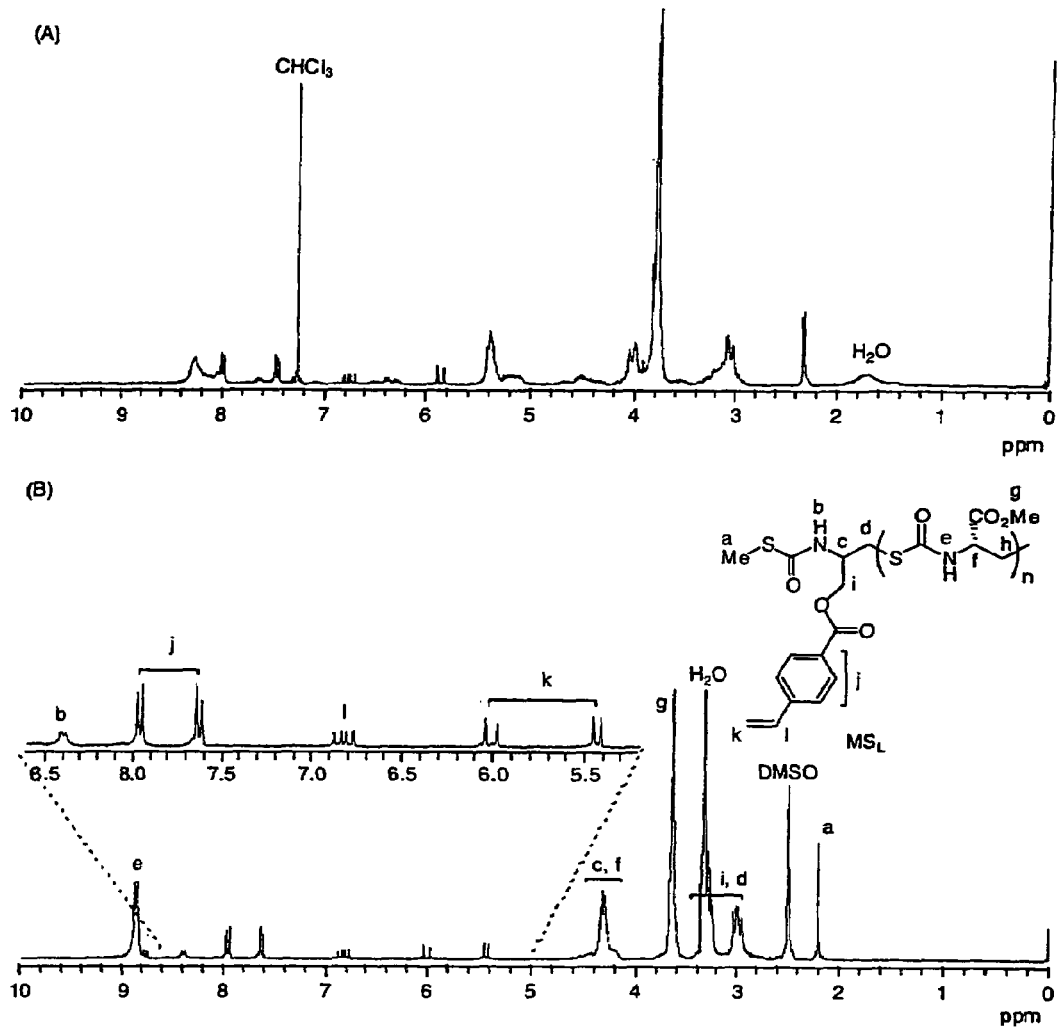
Fig. 10. $^1$H NMR (270 MHz) spectra of MS$_L$ (A) in CDCl$_3$ and (B) in DMSO-$d_6$ obtained by cationic polymerization of S$_L$ with 1A (15 mol%) in CH$_2$Cl$_2$ for 24 h.

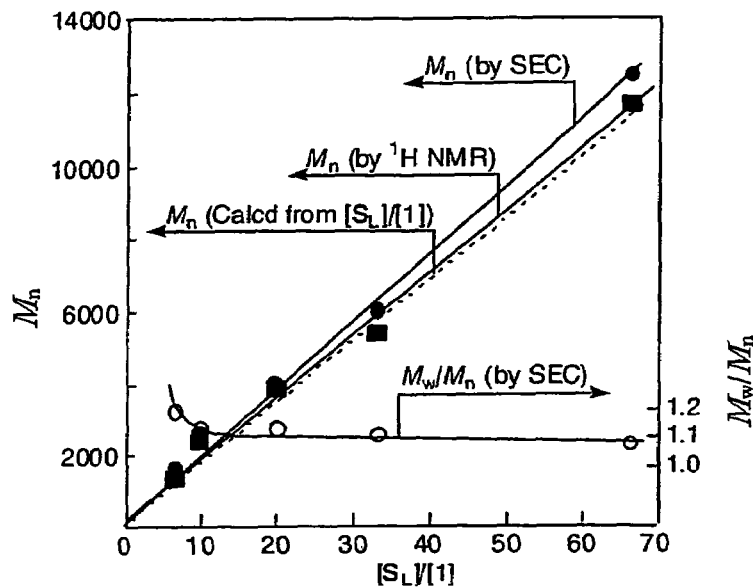
Fig.11.  $M_n$ and $M_w/M_n$ vs feed ratio ($[S_L]/[1A]$) [conditions: solvent: $CH_2Cl_2$ (0.5 M), temp.: 30 °C, $[S_L]/[1] = 6.6-67$, conversion of $S_L$ = 100%]
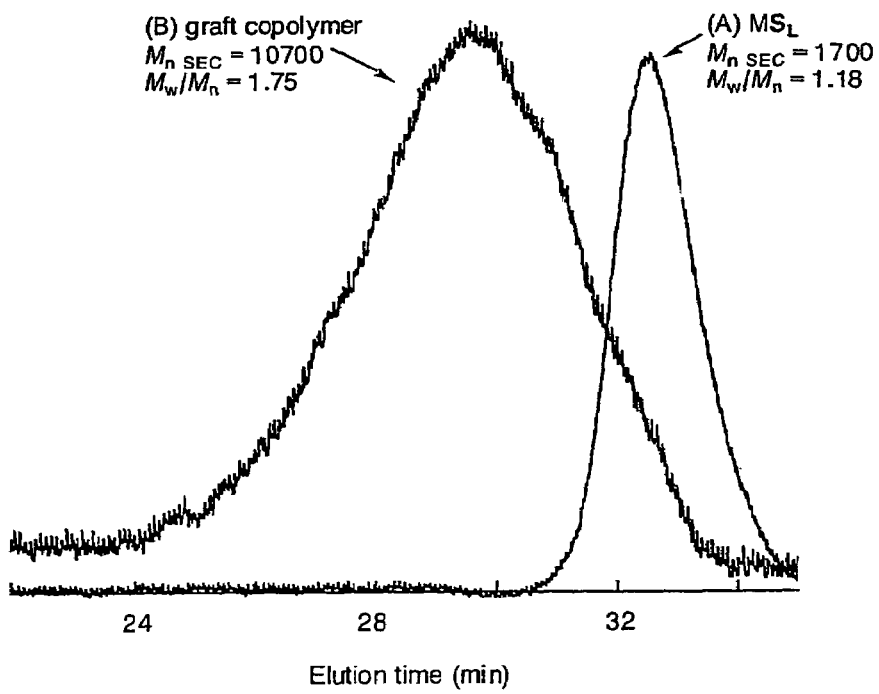
Fig.12.  SEC profiles (UV detector) of (A) $MS_L$ and (B) graft copolymer obtained by radical polymerization (run 3 in Table 2).

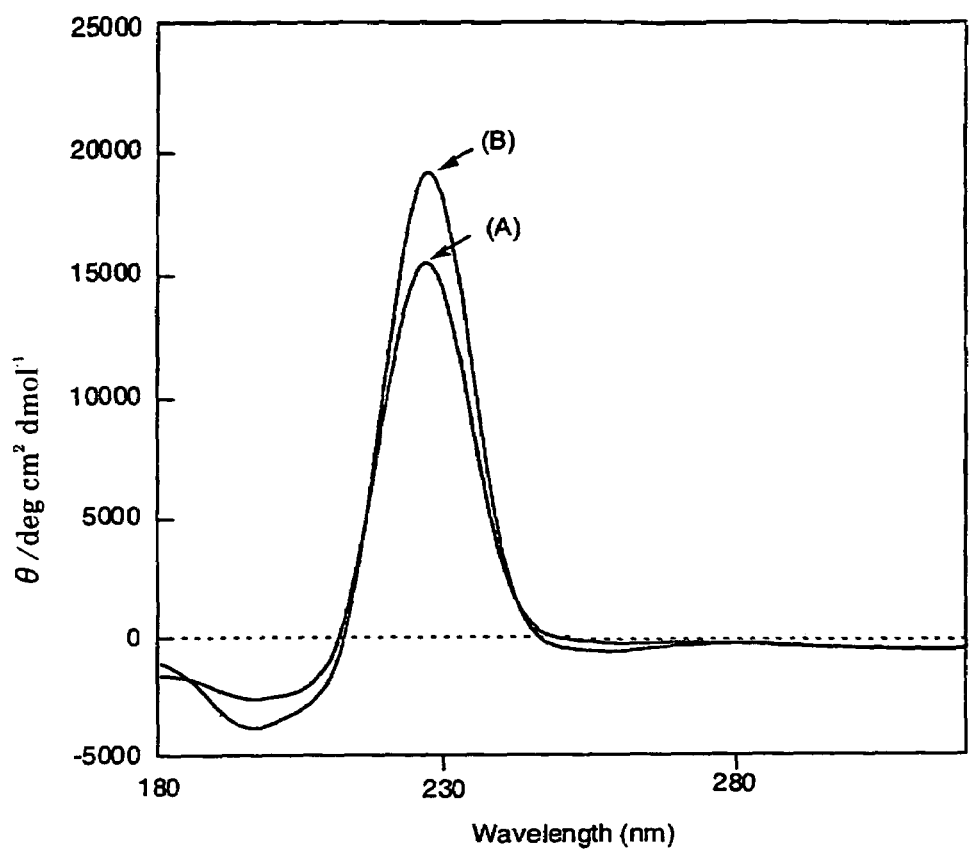
Fig. 13. CD spectra ($c = 0.1$ g/dL, $CH_2Cl_2$) of (A) $MS_L$ and (B) graft copolymer (run 3 in Table 2).

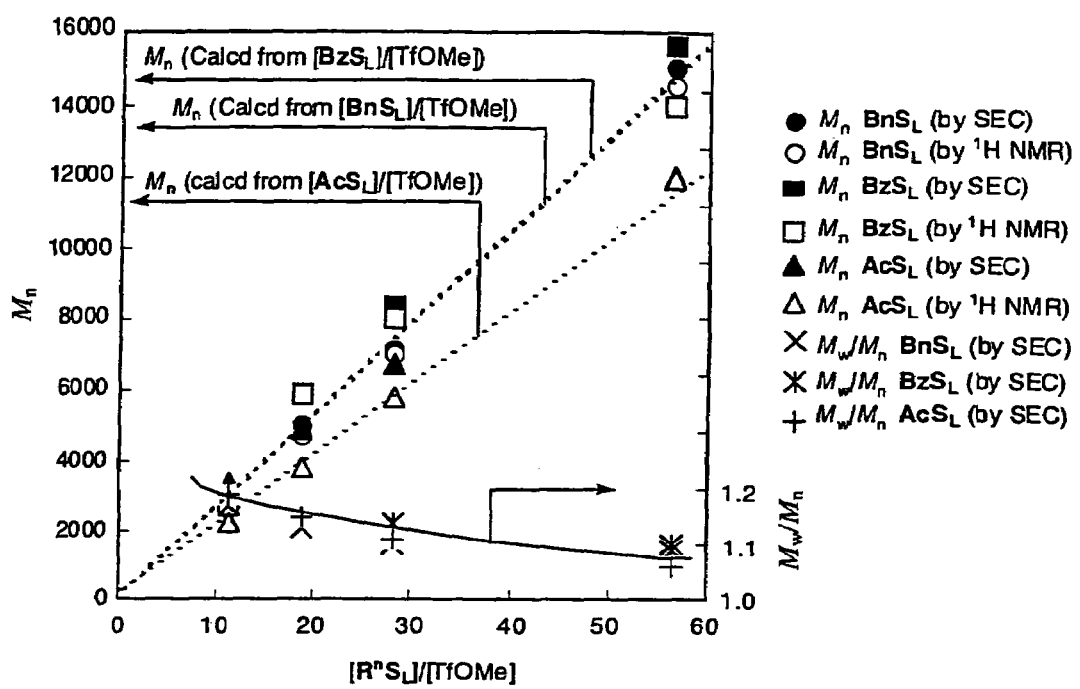
Fig. 14. $M_n$ and $M_w/M_n$ vs feed ratio ([$R^nS_L$]/[TfOMe]) [conditions; solvent: $CH_2Cl_2$ (0.5 M), temp.: 30 °C, [$S_L$]/[1] = 11.5–56.5, conversion of $R^nS_L$ = 100%].

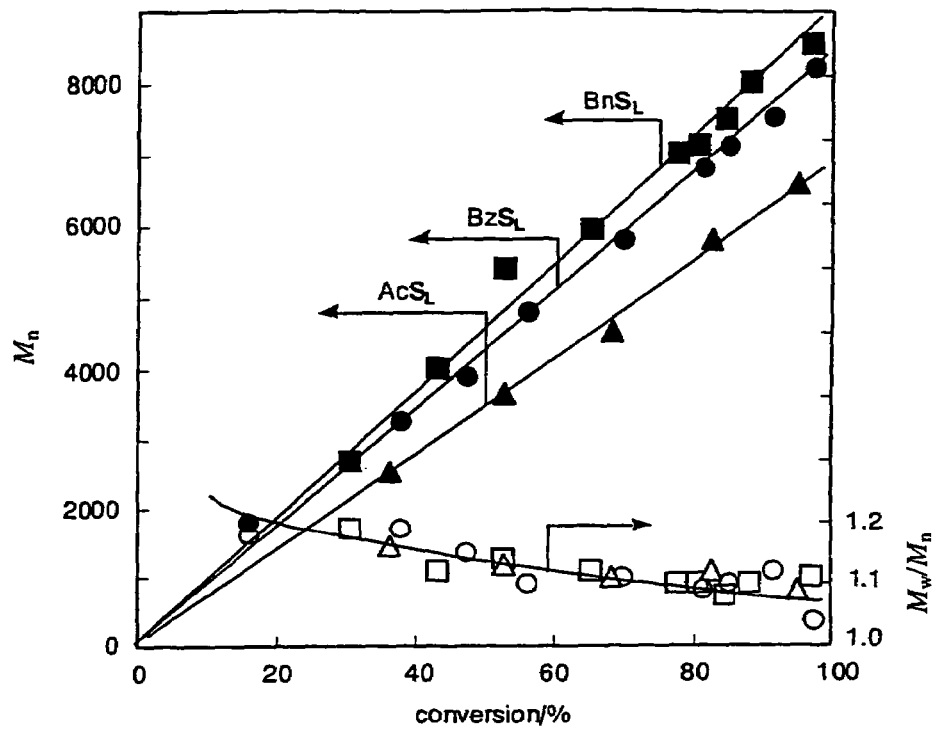
Fig. 15. Time-conversion and first-order time-conversion plots for the polymerization of $R^nS_L$ with TfOMe in $CH_2Cl_2$ at 30 °C; $[TfOMe]_0 = 0.015$ M, $[R^nS_L]_0/[TfOMe]_0 = 32.9$.

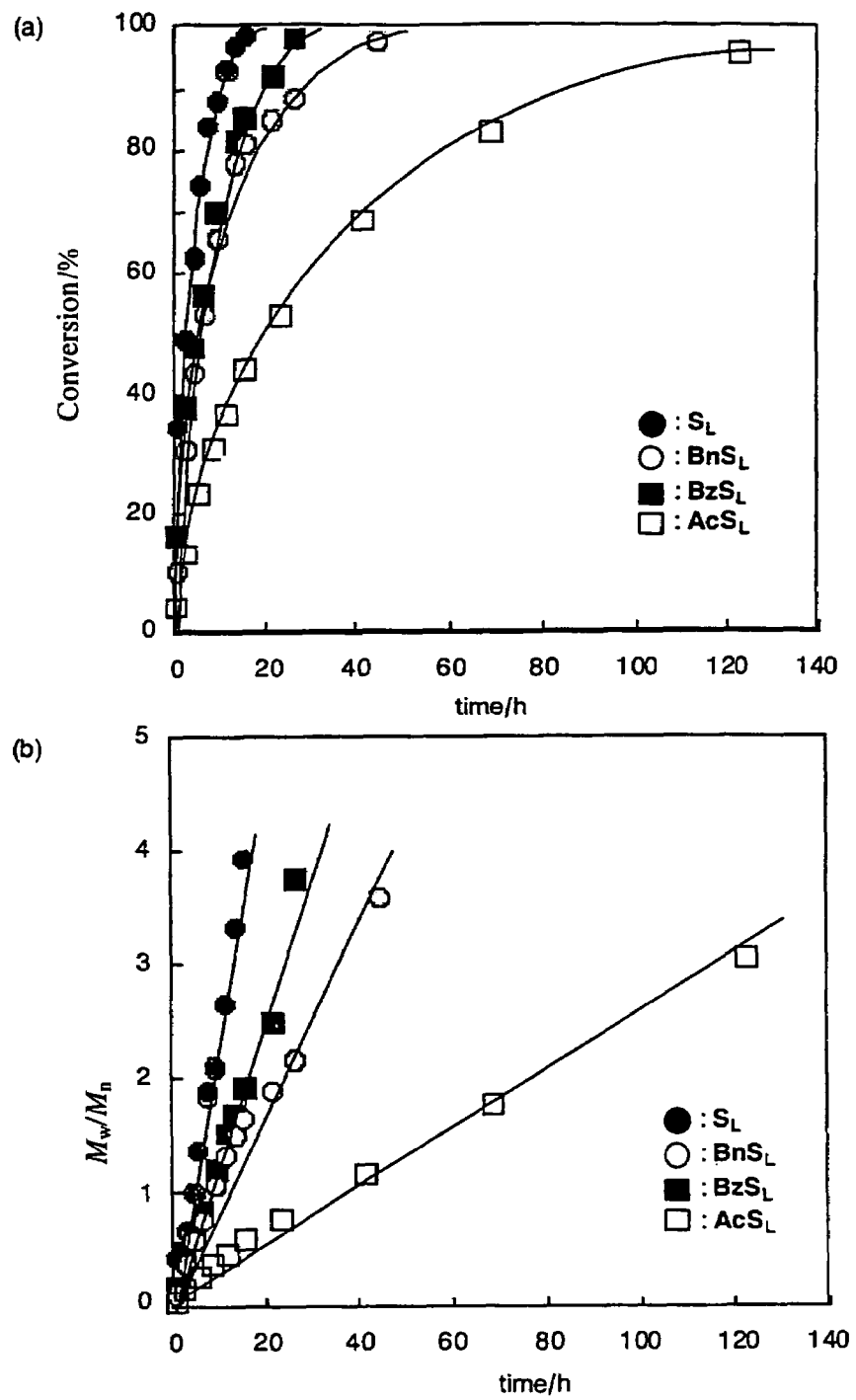
Fig. 16. Conversion-$M_n$ (a) and conversion-$M_w/M_n$ (b) in the polymerization of $R^nS_L$ with TfOMe in $CH_2Cl_2$ at 30 °C; [TfOMe]$_0$ = 0.015 M, [$S_L$]$_0$/[TfOMe]$_0$ = 32.9.

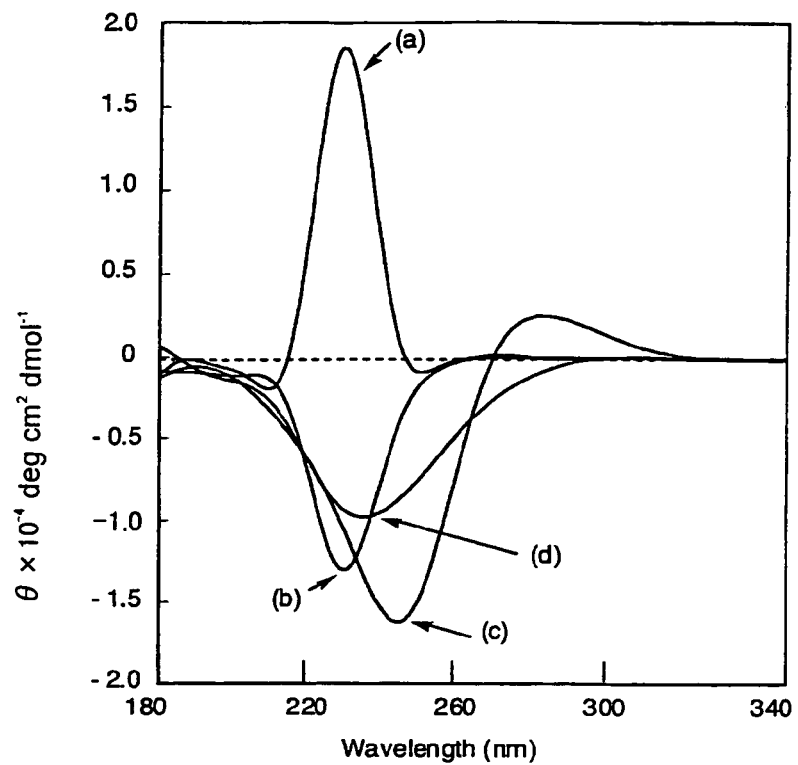
Fig. 17. CD spectra of polythiourethane ($c$ = 0.1 g/dL, in $CH_2Cl_2$): (a) poly($S_L$), (b) poly($BnS_L$), (c) poly($BzS_L$), and poly($AcS_L$).

METHOD OF PRODUCING A POLYTHIOURETHANE AND METHOD OF PRODUCING A GRAFT POLYMER

BACKGROUND OF THE INVENTION

1. Field of the Invention

The present invention relates to a method of producing a polythiourethane and a method of producing a graft polymer.

2. Discussion of the Background

Polythiourethanes have a high refractive index, and may be applicable to optical devices. However, a general method for the synthesis of polythiourethanes, polyaddition of dithiols with diisocyanates is not adequate to synthesize polythiourehanes with highly organized macro-molecular architectures (i.e., controlled molecular weight, head-to-tail structure).

SUMMARY OF THE INVENTION

It is therefore an object of the present invention to provide a method for producing a polythiourethane. It is another object of the present invention to provide a method for producing a graft polymer using the obtained polythiourethane.

This and other objects have been achieved by the present invention the first embodiment of which includes a method for producing a polythiourethane, comprising:

polymerizing a compound represented by formula (I) in the presence of a compound represented by formula (II)

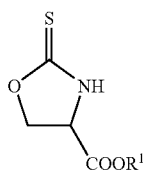
(I)

wherein $R^1$ represents a methyl group;

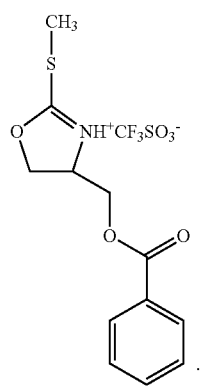
(II)

In another embodiment, the present invention provides a method for producing a polythiourethane, comprising:

polymerizing a compound represented by formula (I) in the presence of a compound represented by formula (III)

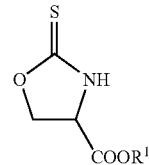
(I)

wherein $R^1$ represents a methyl group;

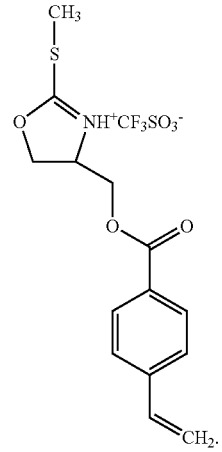
(III)

In yet another embodiment, the present invention provides a method for producing a graft polymer, comprising:

polymerizing the polythiourethane produced by the above second method and a vinyl aromatic compound.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows $M_n$ and $M_w/M_n$ vs feed ratio ($[S_L]/[1]$).

FIG. 2 shows (a) time-conversion and first-order time-conversion plots for the polymerization of $S_L$ with benzoic acid 2-methylsulfanyl-4,5-dihydro-oxazolinium-4-ylmethyl ester trifluoromethanesulfonate 1 in $CH_2Cl_2$ at 30° C. under air, and (b) conversion-$M_n$ and conversion-$M_w/M_n$ plots for the polymerization of $S_L$ with 1 in $CH_2Cl_2$ at 30° C. under air; $[1]_0=0.01$ M, $[S_L]_0/[1]_0=50$.

FIG. 3 shows SEC profiles before and after the post-polymerization experiment of $S_L$. Poly$S_L$: prepolymer obtained in the first-stage polymerization, $M_{n\ SEC}=3400$, $M_{n\ NMR}=2700$, $M_w/M_n=1.17$. Poly($S_L$-p-$S_L$): postpolymer obtained in the second stage polymerization, $M_{n\ SEC}=19000$, $M_{n\ NMR}=17500$, $M_w/M_n=1.09$.

FIG. 4 shows living cationic polymerization under air and water was achieved using well-defined water-resistant cationic initiator in non-distilled $CH_2Cl_2$ at mild temperature.

FIG. 5 shows $^1H$ NMR spectra of 4-hydroxymethyl-1,3-oxazolidine-2-thione.

FIG. 6 shows ¹H NMR spectra of benzoic acid 2-thioxo-oxazolidin-4-ylmethyl ester.

FIG. 7 shows ¹H NMR spectra of benzoic acid 2-methylsulfanyl-4,5-dihydro-oxazolinium-4-ylmethyl ester trifluoromethanesulfonate 1 in $D_2O$.

FIG. 8 shows ¹H NMR spectra of a) polymer obtained under dry nitorogen atmosphere ($M_n$=19540) and b) polymer obtained under air ($M_n$=19605).

FIG. 9 shows ¹H NMR spectra of a) 1 and b) the mixture of 1 and $S_L$.

FIG. 10 shows ¹H NMR (270 MHz) spectra of $MS_L$ (A) in $CDCl_3$ and (B) in DMSO-$d_6$ obtained by cationic polymerization of $S_L$ with 1 (15 mol %) in $CH_2Cl_2$ for 24 hours.

FIG. 11 shows $M_n$ and $M_w/M_n$ vs feed ratio ([$S_L$]/[1]) [conditions; solvent: $CH_2Cl_2$ (0.5 M), temp.: 30° C., [$S_L$]/[1]=6.6–67, conversion of $S_L$=100%].

FIG. 12 shows SEC profiles (UV detector) of (A) $MS_L$ and (B) graft copolymer obtained by radical polymerization (run 3 in Table 2).

FIG. 13 shows CD spectra (c=0.1 g/dL, $CH_2Cl_2$) of (A) $MS_L$ and (B) graft copolymer (run 3 in Table 2).

FIG. 14 shows $M_n$ and $M_w/M_n$ vs feed ratio ([R"$S_L$]/[TfOMe]) [conditions; solvent: $CH_2Cl_2$ (0.5 M), temperature: 30° C., [$S_L$]/[1]=11.5–56.5, conversion of R"$S_L$=100%].

FIG. 15 shows time-conversion and first-order time-conversion plots for the polymerization of R"$S_L$ with TfOMe in $CH_2Cl_2$ at 30° C.; [TfOMe]$_0$=0.015 M, [R"$S_L$]$_0$/[TfOMe]$_0$=32.9.

FIG. 16 shows conversion-$M_n$ (a) and conversion-$M_w/M_n$ (b) in the polymerization of R"$S_L$ with TfOMe in $CH_2Cl_2$ at 30° C.; [TfOMe]$_0$=0.015 M, [$S_L$]$_0$/[TfOMe]$_0$=32.9.

FIG. 17 shows CD spectra of polythiourethane (c=0.1 g/dL, in $CH_2Cl_2$): (a) poly($S_L$), (b) poly(Bn$S_L$), (c) poly(Bz$S_L$), and poly(Ac$S_L$).

DETAILED DESCRIPTION OF THE INVENTION

According to one aspect of the present invention, there is provided a method for producing a polythiourethane comprising polymerizing a compound represented by formula (I) in the presence of a compound represented by formula (III)

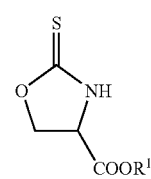

(I)

($R^1$ represents a methyl group)

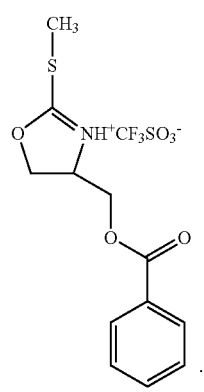

(II)

In another aspect of the present invention, there is provided a method for producing a polythiourethane comprising polymerizing a compound represented by formula (I) in the presence of a compound represented by formula (III)

(I)

($R^1$ represents a methyl group)

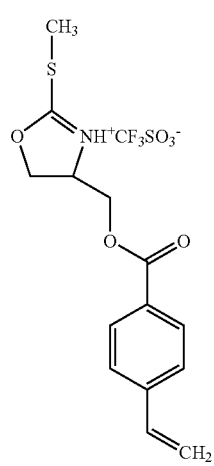

(III)

In yet another aspect of the present invention, there is provided a method for producing a graft polymer comprising polymerizing the polythiourethane produced by the above-mentioned method and a vinyl aromatic compound.

Referring now to the drawings, wherein like reference numerals designate identical or corresponding parts throughout the several views.

1. First Embodiment

A method of producing a polythiourethane of this embodiment is described below.

Living and controlled polymerizations are the most advanced synthetic methods in the field of polymer synthesis. Advantages of these polymerizations include control of molecular weight, monodisperse polymers that have narrow molecular weight distribution, precise topology (e.g., block, graft, and star polymers), and controlled architecture. In spite of the remarkable aspect of these polymerizations, they generally require conditions without moisture and/or oxygen. That is, purification of solvents, inert gas, or sealed tube technique must be employed to avoid termination or chain transfer reaction. These complicating processes prompt many researchers to explore air- and moisture-tolerant initiators and catalysts. For instance, ruthenium carbene complexes for olefin metathesis and rare-earth metal triflates as water-tolerant Lewis acids realized efficient syntheses of varieties of chemical substances even in the presence of air and moisture. However, their effectiveness is still remaining in the range of syntheses of low molecular weight compounds. Although living and controlled polymerizations in the presence of air or water are being currently developed using these catalysts, the molecular weight and their distribution in these polymerization systems (i.e., $M_n<10^4$, $M_w/M_n>1.2$) were not competitive with that of polymerizations under severely purified conditions.

Accordingly, the inventors of this application have developed a controlled cationic ring-opening polymerization of a 1,3-oxazolidine-2-thione derived from L-serine ($S_L$) affording a chiral polythiourethane.

The cationic ring-opening polymerization of 1,3-oxazolidine-2-thione derived from L-serine ($S_L$) using 2-methylsulfanyl-4,5-dihydro-oxazolinium-4-ylmethyl ester trifluoromethanesulfonate, (1) as an initiator under air and moisture are described in the following Scheme 1.

Scheme 1.
Living cationic ring-opening polymerization of $S_L$ with (1)

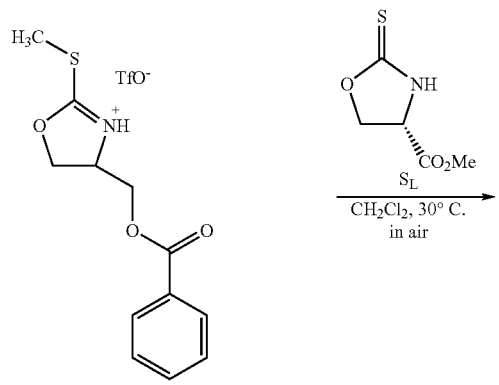

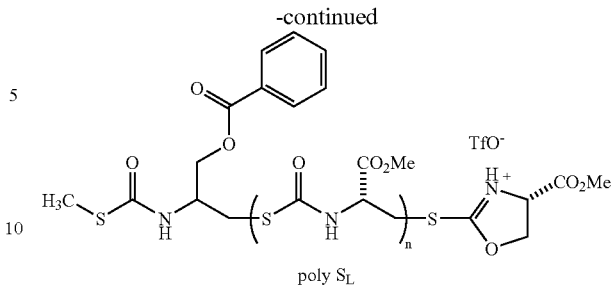

poly $S_L$

The polymerization is preferably carried out at a temperature between room temperature and 40° C. Polar organic solvents such as dichloromethane, chloroform, acetone, methanol, ethanol, DMF, DMSO, and phenylchloride are preferred. Most preferred is dichloromethane. These solvents may be mixed with water. A preferred cationic initiator is benzoic acid 2-methylsulfanyl-4,5-dihydro-oxazolinium-4-ylmethyl ester trifluoromethanesulfonate, (1). Preferably, the cationic polymerization is carried out using a ratio of $[S_L]/[1]$ of >0 to 100. Preferably, the ratio is at least 90, more preferably at least 95 and most preferably at least 99. It is possible, to work in air having high humidity. The air humidity can be as high as 80–90%, however, a lower humidity is possible as well.

Preferably, the polymerization proceeds for a time of between 20 and 50 hours. The polymer (poly($S_L$)) can be obtained in a yield of at least 90%, preferably, at least 95% and most preferably at least 99%. The polymer has a narrow molecular weight distribution $M_w/M_n$ of from 1.0 to 1.2, preferably, below 1.1, more preferably not more than 1.05.

The properties of the polymers obtained according to this process under air are almost equivalent to the properties of polymers obtained under purified conditions.

Examples of Embodiment 1.

The polymerization was carried out at 30° C. in the presence of methyl trifluoromethanesulfonate as a cationic initiator in purified dichloromethane under dry nitrogen atmosphere. The controlled character depends on the highly stable nature of the propagation terminal (cyclic endo-iminothiocarbonate) in this polymerization system.

Thus, a new cationic initiator (benzoic acid 2-methylsulfanyl-4,5-dihydro-oxazolinium-4-ylmethyl ester trifluoromethanesulfonate, (1) was synthesized by the reaction of 1,3-oxazolidine-2-thione derivative and methyl trifluoromethanesulfonate (TfOMe). This initiator was insensitive toward air and water and the $^1$H NMR spectrum was measured in $D_2O$ (see FIG. 7).

The cationic polymerization of $S_L$ was carried out at 30° C. in the presence of (1) ($[S_L]/[1]=100$) in $CH_2Cl_2$ without any purification under air whose humidity is as high as e.g., 80–90%. In this case, the complete consumption of $S_L$ can be confirmed within 35 hours and a white powdery polymer (poly($S_L$)) was obtained in 99% yield. The SEC analysis (Size Exclusion Chromatograhy) of the crude mixture showed a unimodal peak (number-average-molecular weight ($M_n$) was estimated to be 19600) whose distribution ($M_w/M_n=1.09$) was narrow enough. Although this $M_n$ was a little higher than the theoretical value (16551) based on the feed ratio [i.e., $M_n$ (theoretical)=(formula weight of $S_L$; 161.18)×($[S_L]/[1]$; 99)+(formula weights of end groups; the initiating group (284.38) and $S_L$ at the terminal group (310.25))], the $M_n$ value (17233) determined from the $^1$H NMR spectrum (based on the integral ratio of the methyl ester protons in the repeating units and the S-Me protons of the initiating ends) was in good agreement with the theoretical one. The $^1$H NMR spectrum of the polymer ($M_n$=19605) obtained under air was almost equivalent to that ($M_n$=19540) obtained under purified conditions reported previously, demonstrating their entirely same primary structures (see FIG. 8). The specific rotations ($[\alpha]_D^{30}$) of these polymers were almost same value ($[\alpha]_D^{30}$=165.9° and 163.3°). This result also indicates that these polymers consisted of comparable secondary structures. The controlled nature of the present aerial system was confirmed by polymerization with different ratios of $[S_L]/[1]$ (FIG. 1).

Regardless of the $[S_L]/[1]$ ratios, polymers with narrow molecular weight distribution were obtained in quantitative yield and the SEC profiles exhibited unimodal peaks ($M_w/M_n$=1.17–1.05). Molecular weight of the polymers had a linear relationship with $[S_L]/[1]$ ratios. Although number average molecular weight of these polymers estimated by SEC analysis was a little higher than those expected from the ratios of $[S_L]/[1]$, those determined by $^1$H NMR spectroscopy agreed well with expected ones (vide supra). The present system therefore proceeds through the controlled nature and the initiation step occurs quantitatively as the polymerization under purified condition.

To confirm whether the cationic polymerization of $S_L$ proceeds without termination, the inventors of the present invention examined the relationship between molecular weight and conversion, or reaction time in the polymerization of $S_L$ at 30° C. under air. FIG. 2 shows a straight line of $\ln([S_L]_0/[S_L])$ versus time (see (a) of FIG. 2), supporting the constant concentration of active species during the polymerization until the conversion reached to 99%.

The SEC profiles of each obtained polymers showed that the $M_n$s increased linearly with the monomer conversion keeping the narrow unimodal peaks, and those by $^1$H NMR spectra also exhibited similar results (see (b) of FIG. 2). These data demonstrates that termination and chain transfer reactions are not detectable in the present polymerization. Furthermore, the cationic ring-opening polymerization of $S_L$ in the presence of water was achieved by 1 ($[S_L]/[1]$=33.35) in mixed solvent ($CH_2Cl_2:H_2O$=2:1) at 30° C. under air to give the corresponding polymer in 98% yield. The SEC profile also showed a unimodal peak with narrow distribution ($M_w/M_n$=1.14), although the $M_n$ (5720) is slightly higher than the conditions without water. This finding indicates the stability of the active species toward water.

A post-polymerization experiment was also performed to elucidate the stability of the growing ends. When $S_L$ ($[S_L]/[1]$=79.86) was recharged after the complete consumption of the monomer ($[S_L]/[1]$=14.29) fed at the first stage and the post-polymerization was conducted, the recharged monomer was completely consumed to give a corresponding polymer in quantitative yield with respect to the total amounts of $S_L$. As shown in FIG. 3, the elution peak in the SEC profile shifted toward the higher molecular weight region after the post-polymerization keeping a unimodal distribution, which confirms that a growing end in the cationic polymerization of $S_L$ is stable enough to re-initiate the further polymerization.

To the best of the inventors' knowledge, the method of producing the polythiourethane according to this embodiment is the first example of a well-defined controlled cationic ring-opening polymerization ($M_n>10^4$, $M_w/M_n<1.18$) under air and water.

As described above, by the method of producing a polythiourethane according to this embodiment, living cationic ring-opening polymerization under air and water can be achieved using the well-defined water-resistant cationic initiator in dichloromethane without purification at ambient temperature.

2. Second Embodiment

A method of producing a polythiourethane and a method of producing a graft polymer of this embodiment are described below. Polythiourethanes have high refractive index, and may be applicable to optical devices. Although a general method for the synthesis of polythiourethanes, polyaddition of dithiols with diisocyanates is not adequate to synthesize polythiourehanes with highly organized macromolecular architectures (i.e., controlled molecular weight, head-to-tail structure).

Therefore, as described in the first embodiment, the inventors of this application have developed an alternative method for the synthesis of polythiourethanes with controlled architecture by living cationic ring-opening polymerization of a cyclic thiourethane ($S_L$). The highly stable propagating species are also the advantage of this polymerization system. That is, this living polymerization can be conducted under air and moisture by employing a water-stable initiator synthesized by reaction of cyclic thiourethane derivative and methyl trifluoromethanesulfonate (TfOMe). This ensures the high chemoselectivity in this polymerization and prompted us to explore polythiourethanes with functional end groups.

An attractive candidate is macromonomer synthesis. Polymerization of a macromonomer with controlled chirality can produce comb polymers with grafted macromolecular side chains. The densely organized side chain will result in giving new functionality. Although a variety of macromonomers have already been prepared, most have been based on the modification of terminal groups. These techniques are sometimes accompanied by insufficient transformation, which produce polymers contaminated with non-functionalized polymers.

Another method to afford a macromonomer has used an initiator with two polymerizable groups in which one group remains unreacted during the macromonomer synthesis. The polymerization must have high chemoselectivity. Hence, this living polymerization of $S_L$ will be adequate to prepare a graft copolymer based on macromonomer, although typical cationic polymerization is less suitable because of the wide range of polymerizable monomers.

Herein, (a) synthesis of a new cationic initiator comprising both vinyl and triflate group, (b) living polymerization using this initiator to obtain the macromonomer, and (c) radical polymerization of the macromonomer to obtain optically active graft copolymers are described.

The living polymerization is preferably carried out at a temperature between room temperature and 40° C. Polar organic solvents such as dichloromethane are preferred. Preferred initiators have at least one polymerizable group such as an acryl group, a methacryl group and a vinyl group. Vinyl groups are preferred as polymerizable groups. A preferred initiator is 4-vinylbenzoic acid 2-methylsulfanyl-4,5-dihydro-oxazolinium-4-ylmethyl ester trifluoromethanesulfonate (1A). Preferably, the living polymerization is carried out using a ratio of $[S_L]/[1A]$ of >0 to 100. Preferably, the ratio is at least 90, more preferably at least 95 and most preferably at least 99.

Preferably, the living polymerization proceeds for a time of between 20 and 50 hours. The macromonomer can be obtained in a yield of at least 90%, preferably, at least 95% and most preferably at least 99%. The macromonomer has a narrow molecular weight distribution $M_w/M_n$ of from 1.0 to 1.2, preferably, below 1.1, more preferably not more than 1.05.

The radical polymerization to obtain the graft copolymer is preferably carried out at a temperature between room temperature and 40° C. Organic solvents such as phenylchloride are preferred. Dichloromethane or chloroform may be used as well.

Preferably, the radical polymerization proceeds for a time of between 20 and 50 hours. The graft copolymer can be obtained in a yield of at least 70%, preferably, at least 80% and most preferably at least 90%.

Examples of Embodiment 2.

(a) Synthesis of Cationic Initiator 1A

A bifunctional initiator 1A (4-vinylbenzoic acid 2-methylsulfanyl-4,5-dihydro-oxazolinium-4-ylmethyl ester trifluoromethanesulfonate) was synthesized in quantitative yield by reaction of 4-vinylbenzoic acid 2-thioxo-oxazolidin-4-ylmethyl ester and TfOMe in dry acetonitrile (Scheme 2). The structure of 1A was confirmed by $^1$H NMR, $^{13}$C NMR, IR spectroscopies, and by elemental analysis. Although a styryl group is relatively susceptible toward cationic species, the iminum salt could be selectively formed owing to the stability of the resulting salt and the electron-accepting ester group on the benzene ring that decreases the nucleophilicty of the vinyl group.

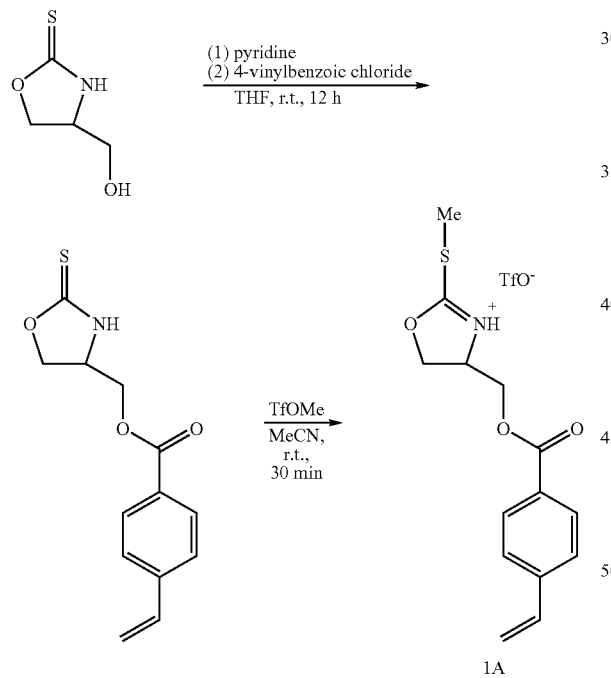

Scheme 2

(b) Synthesis of Macromonomer.

Cationic ring-opening polymerization of $S_L$ was carried out at 30° C. in dry $CH_2Cl_2$ by 4-vinylbenzoic acid 2-methylsulfanyl-4,5-dihydro-oxazolinium-4-ylmethyl ester trifluoromethanesulfonate 1A as an initiator under dry nitrogen (Scheme 3). When the feed ratio $[S_L]_0/[1A]_0$ was 6.6, the reaction was complete within 24 hours and the corresponding polymer was obtained almost quantitatively. The $M_n$ and $M_w/M_n$ are estimated to be 1700 and 1.18, respectively, from SEC analysis. The structure of the resulting polymer was confirmed by the $^1$H NMR, $^{13}$C NMR and IR spectroscopy. The IR spectra showed the characteristic absorption of the carbonyl group in the thiourethane moiety at 1658 cm$^{-1}$. This data indicate that the obtained polymer consists of a thiourethane main chain. FIG. 10 illustrates the $^1$H NMR spectrum of the polymer in CDCl$_3$ with that in DMSO-d$_6$. Although the $^1$H NMR spectrum of the polymer in CDCl$_3$ seems to suggest complicated structure (see (A) of FIG. 10), that of the polymer in DMSO-d$_6$ showed clear peaks (see (B) of FIG. 10). This data should indicate that each protons of $MS_L$ in CDCl$_3$ are under diverse environment because of secondary-structure depending on hydrogen bond, however, in DMSO are under similar circumstance due to independence from hydrogen bond. The signals assignable to the S-Me group at 2.21 ppm, the vinyl group at 5.42–5.46, 5.99–6.05, 6.78–6.88, and the aromatic group at 7.61–7.65 and 8.40–8.42 ppm were observed. The M, estimated from the integral ratios of the initiating end and repeating units ($M_n$ from vinyl group=1654, $M_n$ from aromatic group=1568) agree well with the theoretical value (1465).

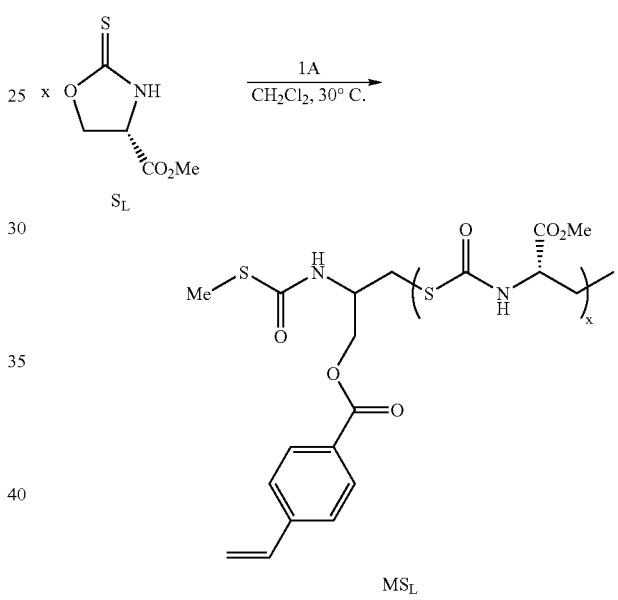

Scheme 3

When polymerization reactions were carried out at 30° C. with varying the feed ratio $[S_L]/[1A]$, the relationship between feed ratio and $M_n$ estimated by both from SEC and $^1$H NMR was linear (FIG. 11). Although the $M_n$ estimated by the SEC analysis were a little higher than those expected from the ratios of $[S_L]/[1A]$, those determined by $^1$H NMR spectroscopy agree well with the expected ones as the case of the polymerization initiated with TfOMe. Furthermore, a post-polymerization could be conducted successfully. Accordingly, the present polymerization system proceeded through a living process in spite of the existence of the styryl groups, which remained unreacted during the macromonomer synthesis. The solubility of obtained $MS_L$ ($M_n$: 1600, 5700 and 11600) toward various organic solvents was examined to determine appropriate solvents for the polymerization of $MS_L$. About 5% (w/v) solution was taken as a criterion for the solubility test. As shown in Table 1, $MS_L$ was soluble in highly polar solvents such as DMF and DMSO regardless of the $M_n$. As the $M_n$ of the obtained macromonomers increased, they became insoluble in less polar solvents. From these results, $MS_L$ ($M_n$=1600) with lower molecular weight that was soluble in wide range of solvents was selected to obtain graft copolymers.

TABLE 1

Solubility of $MS_L$s.[a]

| Run | $M_n$ NMR | benzene | MeOH | acetone | PhCl | $CH_2Cl_2$ | $CHCl_3$ | DMF | DMSO |
|---|---|---|---|---|---|---|---|---|---|
| 1 | 1600 | +− | ++ | ++ | ++ | ++ | ++ | ++ | ++ |
| 2 | 5700 | − | − | +− | +− | +− | +− | ++ | ++ |
| 3 | 11600 | − | − | − | − | − | − | ++ | ++ |

[a]++: soluble at room temperature,
+−: partially soluble or swelling,
−: insoluble.

Radical polymerization of $MS_L$ ($M_n \approx 1600$) and a vinyl aromatic compound (styrene) was carried out at 60° C. for 20 hours in several solvents using AIBN (10 mol %) as an initiator to afford the corresponding copolymers (Scheme 4 and Table 2). Polymerization in neither DMF nor DMSO as polar solvents gave the corresponding graft copolymers and especially that in DMF lead to decrease of the molecular weight due to decomposition of $MS_L$ (runs 1 and 2 in Table 2). To examine why $MS_L$ decomposed under these conditions, a DMF solution of $MS_L$ was stirred at 60° C. for 20 hours without radical initiator, which resulted in the decomposition of $MS_L$. Namely, $MS_L$ proved to be very heat sensitive in polar solvents.

In contrast, the radical polymerization of $MS_L$ in PhCl, a less polar solvent than DMF or DMSO, provided the corresponding graft copolymer in good yield, although the reaction mixture became heterogeneous within 12 hours. No residual vinyl proton signal of the obtained polymer was observed in the $^1$H NMR spectrum (run 3 in Table 2). The Mn of side chain in the graft copolymer was calculated from S-Me protons by the $^1$H NMR spectrum. The $M_n$ showed almost same value with the $M_n$ of $MS_L$ before the polymerization (1651 and 1658, respectively). This result should indicate that the decomposition of thiourethane moieties didn't take place in the present polymerization because of the stable secondary-structure in PhCl that may protect the thiourethane moieties. Although the polymerization proceeded quantitatively, graft copolymers from $MS_L$ having high molecular weight ($M_n > 5700$) were poorly soluble in common organic solvents and the detailed characterization couldn't be performed. However, we could not observed negligible difference between the wavenumbers of NH and C=O absorptions in IR spectra of the graft copolymers obtained from $MS_L$ with $M_n$=5700 and 1600. This data might indicate that the insolubility of the graft polymers originates from the stable hydrogen bond through the grafted side chain polymers that will be strengthened with increase of $M_n$.

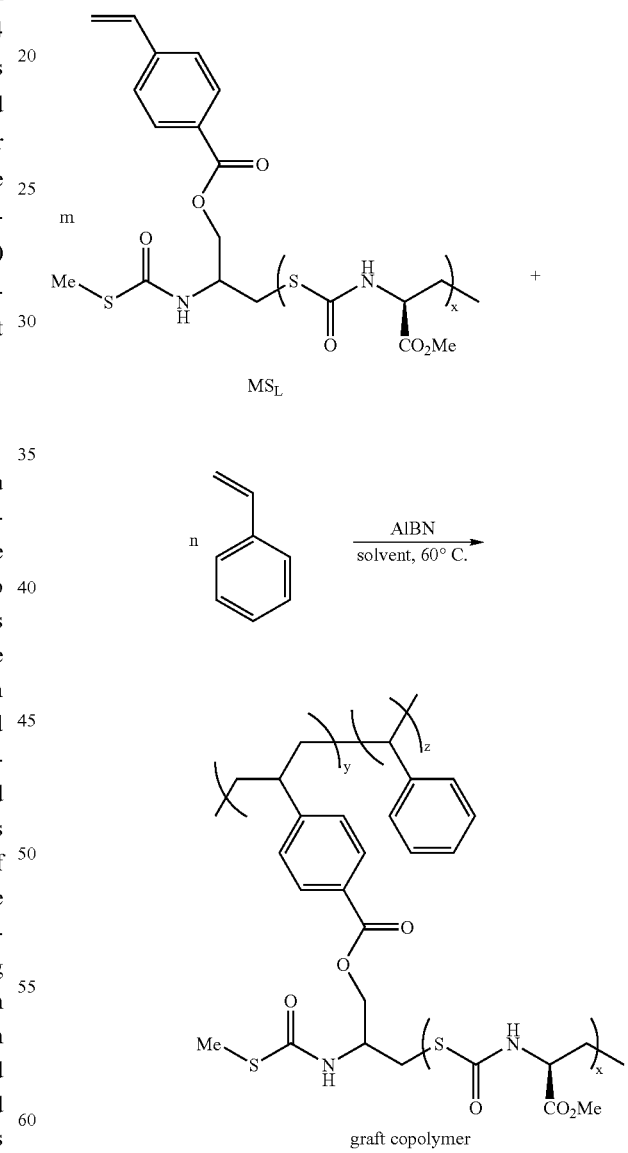

Scheme 4

$M_{n\,SEC} = 1700$
$M_{n\,NMR} = 1600$
$M_W/M_n = 1.18$
$[\alpha]_D^{25} = 46.4°$
$T_m = 114.4°$ C.

TABLE 2

Radical polymerization of $MS_L$ [a]

| Run | Feed Ratio (molar) $MS_L$:St | solvent | Yield[b] (%) | y:z[d] | $M_n$[e] | $M_w/M_n$[e] | $[\alpha]_D^{25}$[f] (°) | $T_m$[g] (° C.) |
|---|---|---|---|---|---|---|---|---|
| 1 | 100:0 | DMF | 0 | — | —[h] | —[h] | —[h] | —[h] |
| 2 | 100:0 | DMSO | 10 | 100:0 | 1050 | 2.50 | 15.5 | 58.8 |
| 3 | 100:0 | PhCl | 89 | 100:0 | 10700 | 1.75 | 60.0 | 122.9 |
| 4 | 75:25 | PhCl | 79[c] | 92:8 | 19800 | 2.77 | 50.2 | 109.5 |
| 5 | 50:50 | PhCl | 69[c] | 82:18 | 16000 | 3.39 | 24.8 | 101.4 |

[a]Conditions: total monomer (0.058 mmol) in solvent (1.0 mL), initiator AIBN (10 mol %), 60° C., 20 h.
[b]Methanol insoluble part.
[c]Acetone insoluble part.
[d]Determined by $^1H$ NMR spectra.
[e]Estimated by SEC (polystyrene standard, eluent; DMF containing 5.0 mM lithium bromide and 5.0 mM phosphoric acid).
[f]Measured by a polarimeter at 25° C. (c = 0.1 g/dL, $CH_2Cl_2$).
[g]Determined by DSC under $N_2$.
[h]Not determined.

As shown in FIG. 12, the elution peak in the SEC profile shifted toward the higher molecular weight region after the polymerization keeping a unimodal distribution. The specific rotation and melting point of the graft copolymer increased from the macromonomer. The Cotton effects [both thiourethane (228 nm) and ester (195 nm)] in the CD spectra (Circular Dichroism spectra) also increased (FIG. 13). These data support that the secondary-structure of the grafted $MS_L$ is more stable than that of $MS_L$.

Radical copolymerization of $MS_L$ with a vinyl aromatic compound (St; styrene) was examined under feed molar ratios of 75:25 and 50:50 (runs 4 and 5 in Table 2). In these cases, the reaction mixtures also became heterogeneous within 10 hours. The copolymers with St were separated from oligoSt by precipitation with acetone after the copolymerization. The unit ratio of the copolymers was estimated by comparing the integral ratio of peaks attributable to the S-Me and the aromatic group to be $MS_L$:St=92:8 and 82:18, respectively. This finding may indicate that the reaction rates of $MS_L$ were higher than that of St. A plausible reason for this phenomenon is the gel effect owing to the poor solubility of $MS_L$ growing end in PhCl. The specific rotation and melting point decreased as increase of styrene component, probably because polystyrene structure was intercalated in grafted $MS_L$ to impair the secondary-structure.

As described above, according to the method of this embodiment, a new cationic initiator, 4-vinylbenzoic acid 2-methylsulfanyl-4,5-dihydro-oxazolinium-4-ylmethyl ester trifluoromethanesulfonate (1A), carrying both vinyl and triflate groups, was synthesized in quantitative yield by reaction of 1,3-oxazolidine-2-thione derivative with methyl trifluoromethanesulfonate.

In addition, according to the method of this embodiment, living cationic ring-opening polymerization of an optically active cyclic thiourethane ($S_L$) derived from L-serine was carried out with 4-vinylbenzoic acid 2-methylsulfanyl-4,5-dihydro-oxazolinium-4-ylmethyl ester trifluoromethanesulfonate (1A) as an initiator in dichloromethane to give the corresponding macromonomers ($MS_L$; $M_n>10^4$, $M_w/M_n<1.18$). That is, $MS_L$ had high molecular weight ($>10^4$) and narrow polydispersity (<1.18). The molecular weight of $MS_L$ could be controlled by [$S_L$]/[1A]. $MS_L$ consists of the optically active thiourethane main chain and styryl group in the initiating end quantitatively.

Further, according to the method of this embodiment, the radical homopolymerization of the macromonomers ($MS_L$) and the copolymerization with styrene were carried out to obtain the corresponding polymers in higher yields. The obtained polymer from $MS_L$ showed higher specific rotation ($[\alpha]_D^{25}$), melting point ($T_m$), and Cotton effect than $MS_L$, supporting the stabilized secondary-structure of grafted poly ($S_L$) side chain.

3. Third Embodiment

A method of producing a polythiourethane of this embodiment is described below.

The chiral polythiourethane (poly ($S_L$)), derived from L-serine by methyl trifluoromethanesulfonate (TfOMe) according to the first and second embodiments, takes secondary-structure based on intramolecular hydrogen bonds. If the hydrogen atoms in the optically active cyclic thiourethane ($S_L$) are replaced by substituents without electron-accepting moieties, the resulting polymers are expected to take different secondary-structure and the substituent will affect the polymerization behavior.

Herein, the cationic ring-opening polymerization behavior of N-substituted cyclic thiourethanes in detail and the chiroptical properties of the obtained polymers are described.

The cationic ring-opening polymerization is preferably carried out at a temperature between room temperature and 40° C. Polar organic solvents such as dichloromethane are preferred. Preferably, the polymerization proceeds for a time of between 20 and 50 hours. The polymer can be obtained in a yield of at least 90%, preferably, at least 95% and most preferably at least 99%. The polymer has a narrow molecular weight distribution $M_w/M_n<1.15$, preferably, below 1.1, more preferably not more than 1.05.

Examples of Embodiment 3.

(a) Controlled Cationic Ring-Opening Polymerization of N-Substituted Cyclic Thiourethanes ($R''S_L$)

The cationic ring-opening polymerization of N-substituted cyclic thiourethanes ($BnS_L$, $BzS_L$, and $AcS_L$) was carried out using TfOMe (3.04 mol %) as an initiator at 30° C. in $CH_2Cl_2$ under nitrogen to give polymers (poly($BnS_L$), poly($BzS_L$), and poly($AcS_L$)) in quantitative yields (Scheme 5). In all cases, the polymerization proceeded smoothly accompanying selective isomerization of the thiocarbonyl groups into the carbonyl groups. The molecular weight distributions ($M_w/M_n$) of the obtained polymers were narrow ($M_w/M_n$<1.15) and the number average molecular weight ($M_n$) (poly($BnS_L$)=8200, poly($BzS_L$)=8500, and poly($AcS_L$)=6600) agreed well with that expected from the feed ratios of [$R''S_L$]/[TfOMe] ($M_{ncalcd}$=8300, 8700, and 6700, respectively).

Scheme 5.
Cationic ring-opening polymerization of $R^nS_L$.

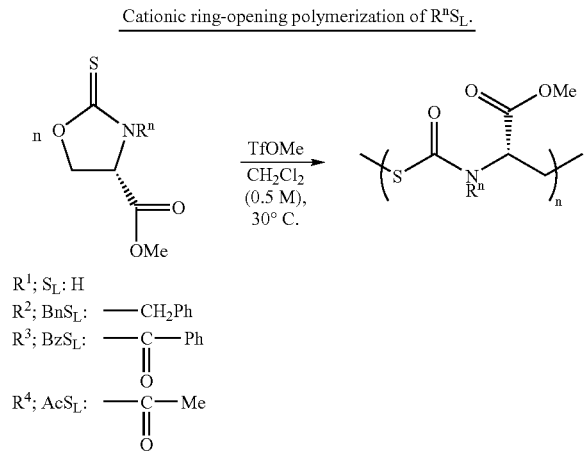

$R^1; S_L$: H
$R^2; BnS_L$: —CH$_2$Ph
$R^3; BzS_L$: —C—Ph
                ‖
                O
$R^4; AcS_L$: —C—Me
                ‖
                O

The inventors of this application expected that this polymerization of the N-substituted monomers would proceed through controlled fashion as well as the previously reported polymerization of $S_L$, and therefore the controlled nature of the polymerization of these monomers with TfOMe was examined by polymerization under various [$R''S_L$]/[TfOMe] ratios. Regardless of the ratios, the polymers with narrow molecular weight distributions were obtained in quantitative yields and the SEC profiles showed unimodal peaks. The relationship between [$R''S_L$]/[TfOMe] ratios and the molecular weight estimated by both from SEC and $^1$H NMR was linear, and the Mn of the polymers agreed well with the expected one (FIG. 14). To find out whether the polymerization of N-substituted monomers proceeds without termination, the relationship between $M_n$, $M_w/M_n$, conversion, and reaction time on the polymerizations of their monomers at 30° C. was examined. $M_n$ of the polymers obtained increased as the monomer conversion with maintaining the linear relationship and the narrow unimodal peaks, as shown in FIG. 15. These data indicates that termination and chain transfer reactions are negligible in the present polymerizations.

(b) The Kinetic Studies on Cationic Polymerization of $S_L$ and N-Substituted Cyclic Thiourethanes The polymerization rates of $S_L$ and N-substituted thiourethanes in CH$_2$Cl$_2$ (0.5 M) were examined at 30° C. using TfOMe (3.04 mol %). FIG. 16 shows the time-conversion (a) and first-order time-conversion (b) plots. The monomer conversions obey the first-order kinetic equation (i.e., $-d[monomer]/dt=k_{obs}[monomer][propagating species]$) indicating that the polymerization proceeded without termination. For the polymerization of $S_L$, the observed rate coefficient $k_{obs}$ was estimated to be $8.44\times10^{-3}$ L·mol$^{-1}$·s$^{-1}$ under the assumption that initiation occurred quantitatively and the concentration of the propagating end was constantly equal to the initial concentration of TfOMe (0.015 mol·L$^{-1}$). This $k_{obs}$ value is 1.8 times larger than that for the polymerization of $BnS_L$ ($k_{obs}$=4.58×10$^{-3}$ L·mol$^{-1}$·s$^{-1}$). As well, the $k_{obs}$ of $BnS_L$ is 1.5 times larger than that of $BzS_L$ ($k_{obs}$=3.12× 10$^{-3}$ L·mol$^{-1}$·s$^{-1}$), and the $k_{obs}$ of $BzS_L$ is 3.3 times larger than that of $AcS_L$ ($k_{obs}$=0.93×10$^{-3}$ L·mol$^{-1}$·s$^{-1}$) (see (b) of FIG. 16).

With the fact that cyclic endo-iminothiocarbonate triflate salts obtained by initiating reactions are highly stable in mind, the iminothiocarbonate triflate salts from the monomers with TfOMe were prepared and the electronic character by $^{13}$C NMR and IR spectroscopy was elucidated to discuss the kinetic results (Scheme 6 and Table 3). Both the $^{13}$C NMR and IR spectra indicate that the electron densities of the thiocarbonyl groups in the cyclic thiourethanes are in the order of the rates of polymerization. Namely, the nucleophilicities of sulfur atoms will also be in the order of $S_L$>$BnS_L$>$BzS_L$>$AcS_L$. For cyclic endo-iminothiocarbonate triflate salts, the $^{13}$C NMR spectra revealed that the electrophilicites of the methylene groups, which are attacked by sulfur atoms of monomers, are in the order of $AcS_L$<$BzS_L$<$BnS_L$≈$S_L$. Although the electron densities of iminothiocarbonate triflate salts from $BnS_L$ and $S_L$ are identical, the nucleophilicty of the the thiocarbonyl group of $S_L$ is higher than that of $BnS_L$. The electronic character of the propagating species and the monomers described here would have reflected the actual the rates of polymerization ($S_L$>$BnS_L$>$BzS_L$>$AcS_L$).

Scheme 6.
Addition of TfOMe to $R^nS_L$.

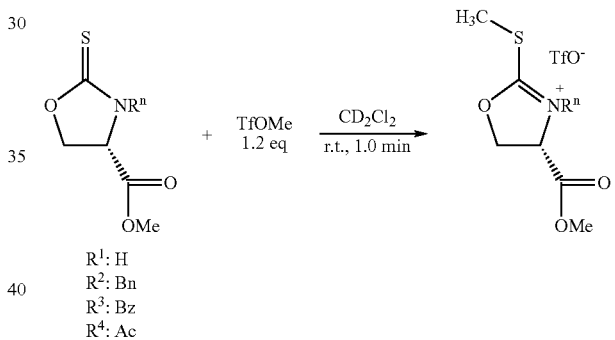

$R^1$: H
$R^2$: Bn
$R^3$: Bz
$R^4$: Ac

TABLE 3

Spectroscopic data of monomers ($R^nS_L$) and iminum salts from $R^nS_L$ and TfOMe

| | | monomer ($R^nS_L$) C = S | | iminothiocarbonate triflate salts[a] O—CH$_2$—C< |
|---|---|---|---|---|
| Run | R | δ/ppm[b] | cm$^{-1}$[c] | δ/ppm[b] |
| 1 | H | 190.73 | 1504 | 77.75 |
| 2 | Bn | 189.34 | 1481 | 77.29 |
| 3 | Bz | 186.51 | 1442 | 79.40 |
| 4 | Ac | 186.26 | 1419 | 80.14 |

[a]Conditions: Reactions of monomers (0.5 mmol) and TfOMe (0.6 mmol, 68 μL) were carried out in CD$_2$Cl$_2$ (0.7 mL) at room temperature for 1.0 min.
[b]Observed in $^{13}$C NMR spectra (CD$_2$Cl$_2$).
[c]Observed in IR spectra (KBr).

(c) CD Spectra of the Obtained Polymers

To characterize the chiroptical properties of the obtained polymers, the CD spectra and specific rotations ([α]$_D^{25}$) of the polymers were evaluated. FIG. 17 illustrates the CD spectra of poly($S_L$) ($M_n$=3000, $M_w/M_n$=1.13, [α]$_D^{25}$=62.4°), poly(BnS$_L$) (M$_n$=3600, M$_w$/M$_n$=1.14, [α]$_D^{25}$=−99.6°), poly(BzS$_L$) (M$_n$=3500, M$_w$/M$_n$=1.15, [α]$_D^{25}$=−127.0°), and poly(AcS$_L$) (M$_n$=3400, M$_w$/M$_n$=1.15, [α]$_D^{25}$=−213.2°). The specific rotation of poly(S$_L$) showed positive value in contrast to those of poly(BnS$_L$), poly(BzS$_L$), and poly(AcS$_L$). The Cotton effect of the thiourethane moiety in poly(S$_L$) at 227 nm is positive, whereas the Cotton effects of the thiourethane moieties in poly(BnS$_L$), poly(BzS$_L$), and poly(AcS$_L$) are negative as well as the specific rotations. This difference may be attributed to the presence of substituents at the nitrogen atoms that leads to construction of secondary-structure based on steric factors irrespective to that of poly(S$_L$) based on hydrogen bonds between the carbonyl and NH moieties. It is assumed that the polythiourethanes from the N-substituted monomers take different secondary-structure from that of poly(S$_L$) regulated by hydrogen bonds (e.g., these polymers have inversed helix sence).

According to the method of this embodiment, N-substituted cyclic thiourethanes (BnS$_L$, BzS$_L$, and AcS$_L$) were synthesized from L-serine methyl ester hydrochloride and were conducted the cationic ring-opening polymerizations by using methyl trifluoromethanesulfonate to obtain the corresponding well-defined polythiourethanes. The molecular weight of the polythiourethanes can be controlled by the ratio of the monomers to the initiator ([R"S$_L$]/[TfOMe]) and the molecular weight distributions are narrow (M$_w$/M$_n$<1.15) in similar manners with the previously reported polymerization of a cyclic thiourethane (S$_L$). The polymerization rates are in the order of S$_L$>BnS$_L$>BzS$_L$>AcS$_L$, which agrees well with the nucleophilicity of the thiocarbonyl moieties of the monomers. The Cotton effects in the CD spectra of the polymers from the N-substituted monomers exhibit almost inverse shape with that of poly(S$_L$) and the specific rotations' signs also inversed, suggesting that poly(S$_L$) and its N-substituted polymers take different high order structure.

Having generally described this invention, a further understanding can be obtained by reference to certain specific examples which are provided herein for purposes of illustration only, and are not intended to be limiting unless otherwise specified.

EXAMPLES

Example 1

Synthesis of benzoic acid 2-thioxo-oxazolidin-4-ylmethyl ester

Synthesis of 4-hydroxymethyl-1,3-oxazolidine-2-thione: To a suspension of serionol (18.2 g, 200 mmol) in MeOH (200 mL) was added triethylamine (55.4 mL, 200 mmol) slowly at 0° C. under nitrogen atmosphere, and then was added a solution of carbon disulfide (22.84 g, 300 mmol) in MeOH (20 mL) at 0° C. The mixture was stirred at 0° C. for 10 min, and then at room temperature for 1 hour. After that, aqueous hydrogen peroxide (30%, 40 mL) was slowly added to the resulting mixture at room temperature, and the mixture was concentrated by a rotary evaporator. The residue was purified by silica gel column chromatography eluted with chloroform/acetone (6/4=v/v), followed by recrystallization from a mixed solvent [n-hexane/ethyl acetate (2/1=v/v)] to afford 4-hydroxymethyl-1,3-oxazolidine-2-thione as a colorless solid (26.2 g, 98%)

Synthesis of benzoic acid 2-thioxo-oxazolidin-4-ylmethyl ester

A solution of benzoyl chloride (14.6 mL, 126.1 mmol) in dry THF (50 mL) was added to a solution of 4-hydroxymethyl-1,3-oxazolidine-2-thione (14.0 g, 105.1 mmol) in dry THF (250 mL) and triethylamine (17.5 mL, 126.1 mmol) at 0° C. After 12 hours of stirring at room temperature, triethylamine hydrochloride was filtered off, and the solvent was distilled out in vacuo. The residue was purified by silica gel column chromatography eluted with ethyl acetate/acetone (1/1=v/v), followed by recrystallization from a mixed solvent [n-hexane/ethyl acetate (3/1=v/v)] to afford benzoic acid 2-thioxo-oxazolidin-4-ylmethyl ester as a colorless solid (20.5 g, 82%).

Synthesis of benzoic acid 2-methylsulfanyl-4,5-dihydro-oxazolinium-4-ylmethyl ester trifluoromethanesulfonate 1

Methyl trifluoromethanesulfonate (0.8 mL, 7.2 mmol) was added to a solution of benzoic acid 2-thioxo-oxazolidin-4-ylmethyl ester (1.42 g, 6.0 mmol) in dry acetonitrile (10 mL) at room temperature under dry nitrogen atmosphere. The mixture was stirred for 3 hours. After that, the solution was poured into dry diethyl ether and the precipitate was isolated by filtration followed by recrystallization from dichloromethane/n-hexane to obtain benzoic acid 2-methylsulfanyl-4,5-dihydro-oxazolinium-4-ylmethyl ester trifluoromethanesulfonate (1) as a white powder (2.38 g, 99%). $^1$H NMR (270 MHz, CD$_2$Cl$_2$, 25° C.): δ=2.56 (s, 3H; —S—CH$_3$), 4.54–4.70 (m, 2H; —CH$_2$—O(C=O)C$_6$H$_5$), 5.02–5.33 (m, 3H; —CH$_2$— and >CH—), 7.49–8.02 (m, 5H; —C$_6$H$_5$), 12.28 (br, 1H; —C=NH$^+$—); $^{13}$C NMR (270 MHz, CD$_2$Cl$_2$, 25° C.) δ=183.3 (—C=NH$^+$—), 166.5 (—CO$_2$CH$_3$), 134.4, 130.3, 129.5, 129.3, 77.4 (—CH$_2$—O(C=O)C$_6$H$_5$), 63.6 (>CH—), 59.2 (—CH$_2$—), 14.7 ppm (—S—CH$_3$); IR (KBr): ν=3178, 3100, 3020, 1720 (>C=O), 1589 (C=NH$^+$), 1473, 1280, 1241, 1164, 1033 cm$^{-1}$. Elemental analysis (%) calcd for C$_{13}$H$_{14}$F$_3$NO$_6$S$_2$ (401.38): C, 38.90; H, 3.52; N, 3.49, S15.98; found: C, 38.74; H, 34.7; N, 3.49, S 16.05.

Typical Living Cationic Polymerization Procedure

A solution of 4(S)-(methoxycarbonyl)-1,3-oxazolidine-2-thione (S$_L$) (0.161 g, 1.0 mmol) in CH$_2$Cl$_2$ (1.0 mL) without any purification, containing 2-methyl-2-butene (0.005%) as a stabilizer, and water (1.0 mL, when needed) was added to a solution of benzoic acid 2-methylsulfanyl-4,5-dihydro-oxazolinium-4-ylmethyl ester trifluoromethanesulfonate (1) (8.0 mg, 20 mol, [S$_L$]/[1]=50) in similar CH$_2$Cl$_2$ (1.0 mL) at 30° C. under air (humidity 89%). The resulting mixture was subjected to polymerization at 30° C. for 35 hours under air. The reaction mixture remained homogeneous during the reaction. After adding methanol for quenching, the resulting mixture was poured into methanol to precipitate a polymer. The polymer was collected by filtration with suction and dried under vacuum. PolyS$_L$ was obtained as a colorless solid quantitatively. [α$_D^{30}$=−147.3° (c=1.0 in DMF); $^1$H NMR (270 MHz, [D$_6$] DMSO, 25° C.): δ=2.21 (—S-Me, terminal group), 2.81–3.05 (1H; —CH$_2$—), 3.26–3.42 (1H; —CH$_2$—), 3.60–3.69 (3H; —OCH$_3$), 4.03–4.14 (>CH—, terminal group), 4.15–4.33 (1H; >CH—), 4.43–4.73 (—CH$_2$—, terminal group), 4.73–4.84 (>CH—, terminal group), 7.44–8.07 (—C$_6$H$_5$, terminal group), 8.03–8.52 (—NH—, terminal group), 8.86–9.10 (1H; —NH—); $^{13}$C NMR (270 MHz, [D$_6$] DMSO, 25° C.): δ=170.5 (—S(C=O)NH—), 166.0 (—(C=O)OCH$_3$), 54.5 (>CH—), 52.4 (—OCH$_3$), 30.0 (—CH$_2$—); IR (KBr): ν=3301, 1743 (—O(C=O)C$_6$H$_5$), 1658 (—S(C=O)NH—), 1511, 1203, 1018, 856 cm$^{-1}$.

Reaction of 1 and S$_L$ (1:S$_L$=1:4)

A solution of S$_L$ (0.032 g, 0.2 mmol) in CH$_2$Cl$_2$ (0.5 mL) was added to a solution of benzoic acid 2-methylsulfanyl-4,5-dihydro-oxazolinium-4-ylmethyl ester trifluoromethanesulfonate (1) (0.02 g, 0.05 mmol) in CH$_2$Cl$_2$ (0.5 mL) at 30° C. under air. After the mixture was stirred for 12 hours, the resulting mixture was concentrated by a rotary evaporator without quenching. The product was characterized by $^1$H NMR spectroscopy (see (b) of FIG. 9). The signal assignable to the S-Me group at 2.80 ppm of 1 completely disappeared and that assignable to the S-Me group at 2.31 ppm of initiating end newly appeared instead. The integral ratios of S-Me and aromatic groups in initiating end were in excellent agreement with theoretical value (3:5), which can be also observed in the polymers. This data will indicate that the initiating efficiency in this polymerization system is quantitative.

Postpolymerization Reaction

A solution of S$_L$ (0.48 g, 3.0 mmol) in CH$_2$Cl$_2$ was added to a solution of benzoic acid 2-methylsulfanyl-4,5-dihydro-oxazolinium-4-ylmethyl ester trifluoromethanesulfonate (1) (0.088 g, 7.29 mol %) in CH$_2$Cl$_2$ (1.0 mL) at 30° C. under air. The mixture was stirred for 30 hours. After the complete conversion of S$_L$ (monitored by $^1$H NMR spectra), a solution of S$_L$ (0.97 g, 6.0 mmol) in CH$_2$Cl$_2$ (12 mL) was added remaining solution. After postpolymerization for 60 hours, methanol was added for quenching. The resulting mixture was poured into methanol and the precipitate was dried in vacuo to give postpolymer (1.40 g, 97%). [α]$_D^{30}$=−160.3 (c=1.0 in DMF); $^1$H NMR (270 MHz, [D$_6$] DMSO, 25° C.): δ=2.21 (—S-Me, terminal group), 2.82–3.04 (1H; —CH$_2$—), 3.25–3.42 (1H; —CH$_2$—), 3.60–3.70 (3H; —OCH$_3$), 4.13–4.32 (1H; >CH—), 7.43–8.06 (—C$_6$H$_5$, terminal group), 8.88–9.12 (1H; —NH—); $^{13}$C NMR (270 MHz, [D$_6$] DMSO, 25° C.): δ=170.7 (—S(C=O)NH—), 166.1 (—(C=O)OCH$_3$), 54.6 (>CH—), 52.3 (—OCH$_3$), 29.9 (—CH$_2$—); IR (KBr): ν=3301, 1743 (—(C=O)OCH$_3$), 1658 (—S(C=O)NH—), 1511, 1203, 1018, 856 cm$^{-1}$.

Example 2

Materials. 4(S)-(Methoxycarbonyl)-1,3-oxazolidine-2-thione (S$_L$) and 4-hydroxymethyl-1,3-oxazolidine-2-thione were synthesized according to the previously reported method. TfOMe (Aldrich Chemical, Co., >99%), chlorobenzene (PhCl), acetonitrile, DMF, DMSO, and CH$_2$Cl$_2$ were distilled over CaH$_2$ before use. Styrene (St) (Kanto Chemical, Co., >99%) was purified by distillation under reduced pressure. 4-Vinylbenzoyl chloride was synthesized according to the literature (Ishizone, T.; Hirao, A,; Nakahama, S. Macromolecules 1989, 22, 2895). Other reagents were used as received.

Measurement. $^1$H (270 MHz) and $^{13}$C NMR (67.5 MHz) spectra were recorded on a JEOL JNH EX-270 spectrometer, using tetramethylsilane (TMS) as an internal standard in CDCl$_3$, CD$_2$Cl$_2$, or DMSO-d$_6$. FT-IR spectra were obtained with a JASCO FT/IR-210 spectrometer. Specific rotations ([α]$_D$) were measured on a JASCO DIP-1000 digital polarimeter equipped a sodium lamp as a light source. Circular dichroism (CD) spectra were measured on a JASCO J-720 spectropolarimeter. Number-average molecular weight (M$_n$) and polydispersity (M$_w$/M$_n$) were estimated by size-exclusion chromatography (SEC) using a Tosoh HPLC HLC-8020 system equipped with four consecutive polystyrene gel columns [TSK-gels (bead size, exclusion limited molecular weight); αM (13 μm, >1×10$^7$), α4000H (10 μm, >1×10$^6$), α3000H (7 μm, >1×10$^5$) and α2500H (7 μm, >1×10$^4$)]; and refractive index and ultraviolet detectors at 40° C. The system was operated at a flow rate of 1.0 mL/min, using N,N-dimethylformamide (DMF) solution (5.0 mM lithium bromide and 5.0 mM phosphoric acid) as an eluent. Polystyrene standards were employed for calibration. Differential scanning calorimetry (DSC) measurements were carried out using an SII DSC-6200 instrument at a heating rate of 10° C./min under nitrogen atmosphere.

Synthesis of 4-vinylbenzoic acid 2-thioxo-oxazolidin-4-ylmethyl ester

A solution of 4-vinylbenzoyl chloride (21.0 g, 126 mmol) in dry THF (50 mL) was added to a solution of 4-hydroxymethyl-1,3-oxazolidine-2-thione (14.0 g, 105 mmol) in dry THF (250 mL) and pyridine (10.2 mL, 126 mmol) at 0° C. After 12 hours of stirring at room temperature, pyridine hydrochloride was filtered off, and the solvent was evaporated out in vacuo. The residue was purified by silica gel column chromatography eluted with ethyl acetate/acetone (1/1=v/v), followed by recrystallization from a mixed solvent [n-hexane/ethyl acetate (3/1=v/v)] to afford 4-vinylbenzoic acid 2-thioxo-oxazolidin-4-ylmethyl ester as a colorless solid. Yield 73% (24.1 g, 91.5 mmol). $^1$H NMR (DMSO-d$_6$): δ=4.25–4.77 (5H, >CH—, —CH$_2$—O(CO)—, and —(SC)O—CH$_2$—), 5.45 (d, J=10.8 Hz, 1H, —CH=CH$_2$), 6.03 (d, J=17.8 Hz, 1H, —CH=CH$_2$), 6.84 (dd, J=11.3 and 17.7 Hz, 1H, —CH=CH$_2$), 7.64 (d, J=8.1 Hz, 2H, —C$_6$H$_4$—), 8.01 (d. J=8.1 Hz, 2H, —C$_6$H$_4$—), 10.3 (broad s, 1H, —NH—) ppm. $^{13}$C NMR (DMSO-d$_6$): δ=55.0 (CO—CH$_2$—CH<), 65.1 (>CH—), 71.8 (—CH$_2$—O(CO)—), 117.7 (—CH=CH$_2$), 126.5, 128.6, 130.1 (—C$_6$H$_4$—), 136.0 (—CH=CH$_2$), 142.2 (—C$_6$H$_4$—), 165.6 (—O(CO)—C$_6$H$_4$—), 189.3 (>C=S) ppm. IR (KBr): 3185, 1712 (—OCOPh), 1504 (C=S), 1280, 1180, 1110, 971 cm$^{-1}$.

Synthesis of 4-vinylbenzoic acid 2-methylsulanyl-4,5-dihydro-oxazolinium-4-ylmethyl ester trifluoromethanesulfonate (1)

Methyl trifluoromethanesulfonate (0.89 mL, 7.00 mmol) was added to a solution of 4-vinyl benzoic acid 2-thioxo-oxazolidine-4-ylmethyl ester (1.58 g, 6.00 mmol) in dry acetonitrile (10 mL) at room temperature under dry nitrogen atmosphere. After the mixture was stirred for 3 hours, the solution was poured into dry diethyl ether and the precipitate was isolated by filtration followed by recrystallization from dichloromethanein-hexane to obtain 4-vinylbenzoic acid 2-methylsulfanyl-4,5-dihydro-oxazolinium-4-ylmethyl ester trifluoromethanesulfonate (1) as a white powder. Yield 98% (3.01 g, 7.01 mmol). $^1$H NMR (CD$_2$Cl$_2$): δ=2.77 (s, 3H, —S—CH$_3$), 4.52–4.61 (dd, J=3.0 and 12.6 Hz, 1H, —CH$_2$—O(CO)—), 4.62–4.72 (dd, J=3.0 and 12.4 Hz, 1H, —CH$_2$—O(CO)—), 4.67–5.07 (m, 2H, CO—CH$_2$—CH<), 5.11–5.20 (m, 1H, >CH—), 5.38–5.48 (dd, J=0.8 and 10.8 Hz, 1H, —CH=CH$_2$), 5.85–5.99 (dd, J=0.8 and 17.4 Hz, 1H, —CH=CH$_2$), 6.79 (dd, J=11.1 and 17.8 Hz, 1H, —CH=CH$_2$), 7.52 (d, J=8.4 Hz, 2H, —C$_6$H$_4$—), 7.97 (d, J=8.4 Hz, 2H, —C$_6$H$_4$—), 12.41 (broad s, 1H, >C=NH$^+$—) ppm. $^{13}$C NMR (CD$_2$Cl$_2$): δ=14.6 (—S—CH$_3$), 59.3 (CO—CH$_2$—CH<), 63.6 (>CH—), 77.4 (—CH$_2$—O(CO)—), 117.6 (—CH=CH$_2$), 127.0, 128.5, 130.7 (—C$_6$H$_4$—), 136.5 (—CH=CH$_2$), 143.5 (—C$_6$H$_4$—), 166.2 (—O(CO)—C$_6$H$_4$—), 183.2 (—C=NH$^+$—) ppm. IR (KBr): 2992, 1720 (—OCOPh), 1589 (—C=NH$^+$—), 1288, 1241, 1164, 1241, 1118, 1025, 640 cm$^{-1}$. C$_{15}$H$_{16}$F$_3$NO$_6$S$_2$: Calcd. C 42.15, H 3.77, N 32.8, S 15.00; Found C, 42.16; H, 3.81; N, 32.4, S 15.16.

Synthesis of Macromonomer (MS$_L$)

A solution of 4(S)-(methoxycarbonyl)-1,3-oxazolidine-2-thione (S$_L$) (2.0 g, 12 mmol) and 4-vinylbenzoic acid 2-methylsulfanyl-4,5-dihydro-oxazolinium-4-ylmethyl ester trifluoromethanesulfonate (1) (0.8 g, 1.9 mg) in dry CH$_2$Cl$_2$ (25 mL) was placed in a round-bottom flask (50 mL) under nitrogen atmosphere. The resulting mixture was subjected to polymerization at 30° C. for 24 hours under nitrogen. The reaction mixture remained homogeneous during the reaction. After adding methanol for quenching, the resulting mixture was poured into ethyl ether to precipitate a polymer. The polymer was collected by filtration with suction and dried under vacuum. A macromonomer (MS$_L$) was obtained as a colorless solid in quantitative yield. [α]$_D^{30}$=−46.4° (c=1.0 g/dL, CH$_2$Cl$_2$). F$_w$ ≈1600 (calculated from $^1$H NMR spectra). $^1$H NMR (DMSO-d$_6$): δ=2.21 (initiating end, —S—CH$_3$), 2.97–3.05 (1H, —CH$_2$—), 3.25–3.38 (1H, —CH$_2$—), 3.64 (3H, —OCH$_3$), 4.19–4.40 (1H, >CH—), 5.49–5.46 (initiating end, —CH=CH$_2$), 5.99–6.05 (initiating end, —CH=CH$_2$), 6.78–6.88 (initiating end, —CH=CH$_2$), 7.61–7.65 (initiating end, —C$_6$H$_4$—), 7.95–7.98 (initiating end, —C$_6$H$_4$—), 8.40–8.42 (initiating end, —NH—), 8.76–8.79 (terminal group, —NH—), 8.86–8.89 (1H, —NH—) ppm. $^{13}$C NMR (DMSO-d$_6$): δ=9.16 (initiating end, —S—CH$_3$), 27.58 (—CH$_2$—), 49.72 (—OCH$_3$), 54.09 (>CH—), 114.70 (initiating end, —CH=CH$_2$), 123.87, 126.55, 127.41, (—C$_6$H$_4$—), 133.01 (initiating end, —CH=CH$_2$), 139.30 (initiating end, —C$_6$H$_4$—), 162.57 (initiating end, —S(CO)NH—), 163.32 (—S(CO)NH—), 167.82 (initiating end, —O(CO)—C$_6$H$_4$—) 167.89 (—COOMe) ppm. IR (KBr): 3309 (—NH—), 1743 (—OCOPh), 1658 (—SCONH—), 1512, 1211, 856 cm$^{-1}$.

Polymerization of MS$_L$

A typical procedure for the polymerization of MS$_L$ is shown as follows. A mixture of MS$_L$ (0.100 g, 0.058 mmol) and AIBN (1.00 mg, 0.00610 mmol) was heated at 60° C. in PhCl for 20 hours in a degassed sealed tube. After the reaction, the resulting mixture was dissolved in DMSO, and poured into methanol to precipitate a white powdery polymer. To precipitate copolymers with styrene, Acetone was employed as poor solvent instead. The precipitated product was collected by filtration and dried under vacuum. Yield=89% (90 mg, 0.0520 mmol). $^1$H NMR (DMSO-d$_6$): δ=$^1$H NMR (DMSO-d$_6$): δ=2.18 (initiating end, —S—CH$_3$), 2.93–3.12 (1H, —CH$_2$—), 3.23–3.40 (1H, —CH$_2$—), 3.64 (3H, —OCH$_3$), 4.10–4.40 (1H, >CH—), 7.65–7.97 (initiating end, —C$_6$H$_4$—), 8.04–8.15 (initiating end, —C$_6$H$_4$—), 8.39–8.40 (initiating end, —NH—), 8.85–8.92 (1H, —NH—) ppm. M$_n$=10700 (M$_w$/M$_n$=1.75) (run 3 in Table 1).

Example 3

Materials. 4(S)-(Methoxycarbonyl)-1,3-oxazolidine-2-thione (S$_L$) and (S)-N-benzylserine methyl ester were synthesized according to the previously reported method (Nagai, A.; Miyagawa, T.; Kudo, H.; Endo, T. *Macromolecules* 2003, 36, 9335., Thompson, C. M.; Frick, J. A.; Green, D. L. C.; *J. Org. Chem.* 1990, 55, 111.). Methyl trifluoromethanesulfonate (TfOMe) (Aldrich Chemical, Co., >99%), triethylamine (Tokyo Kasei Kogyo, Co., >99%), and dichloromethane (CH$_2$Cl$_2$) were distilled over CaH$_2$ before use. Tetrahydrofuran (THF) was distilled over sodium. Other regents were used as received.

Measurement. $^1$H (270 MHz) and $^{13}$C NMR (67.5 MHz) spectra were recorded on a JEOL JNM-LA-270 spectrometer, using tetramethylsilane (TMS) as an internal standard in CDCl$_3$ and DMSO-d$_6$. FT-IR spectra were obtained with a JASCO FT/IR-210 spectrometer. Specific rotations ([α]$_D$) were measured on a JASCO DIP-1000 digital polarimeter equipped a sodium lamp as a light source. Circular dichroism (CD) spectra were measured on a JASCO J-720 spectropolarimeter. Number-average molecular weight (M$_n$) and molecular weight distribution (M$_w$/M$_n$) were estimated by size-exclusion chromatography (SEC) using a Tosoh HPLC HLC-8020 system equipped with; four consecutive polystyrene gel columns [TSK-gels (bead size, exclusion limited molecular weight); αM (13 μm, >1×10$^7$), α4000H (10 μm, >1×10$^6$), α3000H (7 μm, >×10$^5$) and α2500H (7 μm, >1×10$^4$)]; and refractive index and ultraviolet detectors at 40° C. The system was operated at a flow rate of 1.0 mL/min, using N,N-dimethylformamide (DMF) solution (5.0 mM lithium bromide and 5.0 mM phosphoric acid) as an eluent. Polystyrene standards were employed for calibration.

4(S)-(Methoxycarbonyl)-N-benzyl-1,3-oxazolidine-2-thione (BnS$_L$)

Thiophosgene (23.8 g, 207 mmol) in dry THF (200 mL) was slowly added to a solution of N-benzyl-L-serine (43.4 g, 207 mmol), triethylamine (41.9 g, 414 mmol) in dry THF (600 mL) at 60° C. under nitrogen. The mixture was stirred for 3 hours, and was stirred at room temperature for 12 hours. Triethylamine hydrochloride was removed by filtration and the solvent was evaporated in vacuo. The residue was purified by silica gel column chromatography eluted with ethyl acetate/n-hexane (1/1=v/v). Recrystallization from a mixed solvent [THF/n-hexane (2/1=v/v)] gave BnS$_L$ (40.1 g, 77%) as a white powder. [α]$_D^{25}$=35.0° (c=0.1 g/dL, in CH$_2$Cl$_2$). m.p.=101.3–101.8° C. $^1$H NMR (CD$_2$Cl$_2$): δ=3.70 (s, 3H, —OCH$_3$), 4.32–4.37 (m, 1H, —CH$_2$—), 4.54–4.59 (3H, —CH<, —CH$_2$—, and —CH$_2$—C$_6$H$_5$), 5.31–5.42 (m, 1H, —CH$_2$—C$_6$H$_5$), 7.33–7.38 (5H, —C$_6$H$_5$) ppm. $^{13}$C NMR (CD$_2$Cl$_2$): δ=51.47 (—CH$_2$—C$_6$H$_5$), 53.06 (—OCH$_3$), 59.90 (—CH<), 65.55 (—CH$_2$—), 128.98, 129.04, 129.48, 135.09 (—C$_6$H$_5$), 169.55 (—COOCH$_3$), 189.39 (—OCSNH—) ppm. IR (KBr): 1743 (—COOCH$_3$), 1481 (C=S), 1450, 1357, 1304, 1211, 971, 701 cm$^{-1}$. C$_{12}$H$_{13}$NO$_3$S: Calcd. C 57.35, H 5.21, N 5.57, S 12.76; Found C 57.54; H 5.19; N 5.64, S 12.72.

4(S)-(Methoxycarbonyl)-N-benzoyl-1,3-oxazolidine-2-thione (BzS$_L$)

Benzoyl chloride (14.2 g, 112 mmol) in dry CH$_2$Cl$_2$ was slowly added to a solution of S$_L$ (15.0 g, 93.0 mmol) and pyridine (9.6 g, 121 mmol) at 0° C. under nitrogen. The mixture was allowed to reach room temperature, and then water was added with stirring. The organic phase was dried over MgSO$_4$ and the solvent was evaporated under reduced pressure. The residue was purified by silica gel column chromatography eluted with ethyl acetate/n-hexane (1/1=v/v). Recrystallization from a mixed solvent [ethyl acetate/n-hexane (2/1=v/v)] gave BzS$_L$ (23.4 g, 95%) as a colorless solid. $[\alpha]_D^{25}$=−28.9° (c=0.1 g/dL, in CH$_2$Cl$_2$). m.p.=87.2–88.0° C. $^1$H NMR (CD$_2$Cl$_2$): δ=3.76 (s, 3H, —OCH$_3$), 4.56–4.60 (m, 1H, —CH$_2$—), 4.77–4.81 (m, 1H, —CH<), 5.21–5.26 (m, 1H, —CH$_2$—), 7.40–7.74 (5H, —C$_6$H$_5$) ppm. $^{13}$C NMR (CD$_2$Cl$_2$): δ=53.98 (—OCH$_3$), 60.81 (—CH<), 70.05 (—CH$_2$—), 128.72, 130.13, 133.45, 133.59 (—C$_6$H$_5$), 168.97 (—COOCH$_3$), 170.98 (—NHCO—C$_6$H$_5$), 186.51 (—OCSNH—) ppm. IR (KBr): 1751 (—COOCH$_3$), 1682 (—NHCO—C$_6$H$_5$), 1442 (—OCSNH—), 1373, 1311, 1250, 1219, 1188, 964, 910, 733, 694 cm$^{-1}$. C$_{12}$H$_{11}$NO$_4$S: Calcd. C, 54.26; H, 4.18; N, 5.28, S 12.09; Found C 54.21, H 4.11, N 5.28, S 11.90.

4(S)-(Methoxycarbonyl)-N-acetyl-1,3-oxazolidine-2-thione (AcS$_L$)

The same procedure was followed as described for BzS$_L$ using acetyl chloride (8.71 g, 111 mmol). Recrystallization from a mixed solvent [ethyl acetate/n-hexane (2/1=v/v) gave AcS$_L$ (17.3 g, 92%) as a colorless solid. $[\alpha]_D^{25}$=−29.0° (c=0.1 g/dL, in CH$_2$Cl$_2$). m.p.=68.0–68.4° C. $^1$H NMR (CH$_2$Cl$_2$): δ=2.81 (s, 3H, —COCH$_3$), 3.79 (s, 3H, —OCH$_3$), 4.53 (dd, J=4.05 and 5.97 Hz, 1H, —CH$_2$—), 4.64 (m, 1H, —CH<), 5.15 (dd, J=4.05 and 5.40 Hz, 1H, —CH$_2$—) ppm. $^{13}$C NMR (CD$_2$Cl$_2$): δ=25.97 (—COCH$_3$), 53.64 (—OCH$_3$), 60.00 (—CH<), 69.61 (—CH$_2$—), 169.26 (—COOCH$_3$), 171.68 (—NHCOCH$_3$), 186.26 (—OCSNH—) ppm IR (KBr): 1758 (—COOCH$_3$), 1712 (—NHCOCH$_3$), 1419 (—OCSNH—), 1373, 1311, 1227, 1180, 1041, 980, 957 cm$^{-1}$. C$_7$H$_9$NO$_4$S: C 41.37; H 4.46; N 6.89, S 15.78; Found C 41.24; H 4.46; N, 6.88, S 15.78.

Cationic Polymerization of S$_L$ Derivatives

A typical procedure is shown as follows. Dry CH$_2$Cl$_2$ (6.0 mL) and 3.04 mol % of TfOMe were introduced to a polymerization tube containing S$_L$ (0.48 g, 3.0 mmol) subsequently. The resulting mixture was stirred at 30° C. for 8 hours under nitrogen. The reaction proceeded homogeneously. After quenching with triethylamine (0.2 mL), the resulting mixture was poured into ethyl ether (300 mL) to precipitate a polymer. The polymer was collected by filtration with suction and dried under vacuum. PolyS$_L$ was obtained as a colorless solid quantitatively. M$_n$=6100, M$_w$/M$_n$=1.13. $^1$H NMR (DMSO-d$_6$): δ=2.21 (initiating end, S—CH$_3$), 2.89–3.11 (1H, —CH$_2$—), 3.17–3.37 (1H, —CH$_2$—), 3.55–3.76 (3H, —OCH$_3$), 4.21–4.41 (1H, >CH—), 8.79–9.00 (1H, —NH—) ppm. $^{13}$C NMR (DMSO-d$_6$): δ=29.5 (—CH$_2$—), 53.0 (—OCH$_3$), 54.37(>CH—), 163.89 (—SCONH—), 167.38 (—COOCH$_3$) ppm. IR (KBr): 3301, 1743 (—COOCH$_3$), 1658 (—SCONH—), 1512, 1203 cm$^{-1}$.

Poly(BnS$_L$) (Yield: quantitative). colorless solid. M$_n$=8200, M$_w$/M$_n$=1.04. $^1$H NMR (DMSO-d$_6$): δ=2.22 (initiating end, S—CH$_3$), 3.36–3.67 (3H, —OCH$_3$), 4.05–4.92 (3H, —CH<and —CH$_2$—), 7.05–7.28 (5H, —C$_6$H$_5$) ppm. $^{13}$C NMR (DMSO-d$_6$): δ=29.4 (—CH$_2$—), 52.3 (—OCH$_3$), 53.18 (>CH—), 60.67 (—CH$_2$—C$_5$H$_6$), 127.87, 128.13, 128.45, 135.86 (—C$_6$H$_5$), 168.08 (—SCONH—), 169.12 (—COOCH$_3$) ppm. IR (KBr): 3456, 1743 (—COOCH$_3$), 1651 (—SCONH—), 1404, 1311, 1180, 1072, 987, 710 cm$^{-1}$.

Poly(BzS$_L$) (Yield: quantitative). light green solid. M$_n$=8500, M$_w$/M$_n$=1.11. $^1$H NMR (DMSO-d$_6$): δ=2.21 (initiating end, S—CH$_3$), 2.88–3.79 (5H, —CH$_2$— and —OCH$_3$), 4.73–5.06 (1H, —CH<), 7.16–8.04 (5H, —C$_6$H$_5$) ppm. $^{13}$C NMR (DMSO-d$_6$): δ=30.7 (—CH$_2$—), 52.9 (—OCH$_3$), 59.6 (—CH<), 128.60, 129.02, 132.95, 133.88 (—C$_6$H$_5$), 168.42 (—SCONH—), 171.28 (—NHCO—C$_6$H$_5$), 172.12 (—COOCH$_3$) ppm. IR (KBr): 3394, 1751 (—COOCH$_3$), 1702 (—NHCO—C$_6$H$_5$), 1658 (—SCONH—), 1296, 1203, 1126, 694 cm$^{-1}$.

Poly(AcS$_L$) (Yield: quantitative). colorless solid. M$_n$=6600, M$_w$/M$_n$=1.09. $^1$H NMR (DMSO-d$_6$): δ=2.21 (initiating end, S—CH$_3$), 2.18–2.44 (3H, —CH$_3$), 2.74–3.81 (5H, —CH$_2$— and —OCH$_3$), 4.72–5.10 (1H, —CH<) ppm. $^{13}$C NMR (DMSO-d$_6$): δ=24.5 (—COCH$_3$), 29.90 (—CH$_2$—), 52.76 (—OCH$_3$), 59.46 (—CH<), 170.00 (—SCONH—), 171.50 (—NHCO—CH$_3$), 173.34 (—COOCH$_3$) ppm. IR (KBr): 3370, 1751 (—COOCH$_3$), 1703 (—NHCO—CH$_3$), 1658 (—SCONH—), 1373, 1250, 1203, 1003 cm$^{-1}$.

Methylation of S$_L$ Derivatives with TfOMe

A typical procedure is shown as follows. A solution of S$_L$ (0.15 g, 0.77 mmol) in CD$_2$Cl$_2$ (0.8 mL) was placed in an NMR tube under nitrogen atmosphere. The tube was sealed after the addition of TfOMe (93 μL, 0.85 mmol), and the mixture was stirred for 1.0 min at room temperature. The iminothiocarbonate triflate salt (Me-S$_L$) from S$_L$ and TfOMe was characterized by $^1$H NMR, $^{13}$C NMR and IR spectroscopy. $^1$H NMR (CD$_2$Cl$_2$): δ=2.76 (s, 3H, —SCH$_3$), 3.85 (s, 3H, —OCH$_3$), 5.20–5.39 (3H, >CH— and —CH$_2$—), 11.92 (broad s, 1H, =HN$^+$) ppm. $^{13}$C NMR (CD$_2$Cl$_2$): δ=14.53 (—SCH$_3$), 54.23 (—OCH$_3$), 60.07 (>CH—), 77.75 (—CH$_2$—), 167.82 (—COOCH$_3$), 183.96 (—C=HN$^+$) ppm. IR (CD$_2$Cl$_2$): 2962, 1751 (—COOCH$_3$), 1581 (—C=HN$^+$), 1481, 1442, 1357, 1281, 1241, 1165, 1034, 957, 918, 640 cm$^{-1}$.

Me-BnS$_L$ $^1$H NMR (CD$_2$Cl$_2$): δ=2.79 (s, 3H, —SCH$_3$), 3.67 (s, 3H, —OCH$_3$), 4.89 (s, 2H, —CH$_2$—C$_6$H$_5$), 5.00–5.45 (3H, —CH<and —CH$_2$—), 7.41 (5H, —C$_6$H$_5$) ppm. $^{13}$C NMR (CD$_2$Cl$_2$): δ=15.09 (—SCH$_3$), 52.51 (—CH$_2$—C$_6$H$_5$), 54.07 (—OCH$_3$), 63.32 (>CH—), 77.29 (—CH$_2$—), 129.96, 130.08, 130.39, 130.73 (—C$_6$H$_5$), 167.35 (—COOCH$_3$), 183.03 (—C=HN$^+$) ppm. IR (CD$_2$Cl$_2$): 3502, 3039, 2963, 1751 (—COOCH$_3$), 1566 (—C=HN$^+$), 1435, 1412, 1265, 1157, 1034, 964, 926, 710, 640, 517 cm$^{-1}$.

Me-BzS$_L$ $^1$H NMR (CD$_2$Cl$_2$): δ=2.74 (s, 3H, —SCH$_3$), 3.67 (s, 3H, —OCH$_3$), 5.43–5.46 (m, 1H, —CH$_2$—), 5.73–5.87 (3H, —CH<and —CH$_2$—), 7.53–7.90 (5H, —C$_6$H$_5$) ppm. $^{13}$C NMR (CD$_2$Cl$_2$): δ=16.17 (—SCH$_3$), 54.05 (—OCH$_3$), 62.94 (>CH—), 79.40 (—CH$_2$—), 129.52, 130.07, 130.68, 135.16 (—C$_6$H$_5$), 167.10 (—COOCH$_3$), 167.52 (—NHCO—C$_6$H$_5$), 189.79 (—C=HN$^+$) ppm. IR (CD$_2$Cl$_2$): 3070, 1751 (—COOCH$_3$), 1658 (—NHCO—C$_6$H$_5$), 1604 (—C=HN$^+$), 1543, 1473, 1442, 1381, 1288, 1234, 1165, 1026, 972, 895, 717, 640, 517 cm$^{-1}$.

Me-AcS$_L$ $^1$H NMR (CD$_2$Cl$_2$): δ=2.49 (s, 3H, —SCH$_3$), 2.73 (—CH$_3$), 3.91 (s, 3H, —OCH$_3$), 5.50 (dd, J=3.78 and 5.13 Hz, 1H, —CH$_2$—), 5.63 (m, 1H, —CH<), 5.84 (dd, J=4.05 and 6.21 Hz, 1H, —CH$_2$—) ppm. $^{13}$C NMR (CD$_2$Cl$_2$): δ=15.89 (—SCH$_3$), 23.67 (—CH$_3$), 54.87 (—OCH$_3$), 61.64 (>CH—), 80.14 (—CH$_2$—), 167.66

(—COOCH$_3$), 170.11 (—NHCO—CH$_3$), 188.98 (—C=HN$^+$) ppm. IR (CD$_2$Cl$_2$): 3032, 2962, 1751 (—COOCH$_3$), 1713 (—C=HN$^+$), 1442 (—NHCO—CH$_3$), 1389, 1281, 1234, 1165, 1034, 980, 640 cm$^{-1}$.

Japanese patent application 2004-137712 filed May 6, 2004, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A method for producing a polythiourethane, comprising:
polymerizing a compound represented by formula (I) in the presence of a compound represented by formula (II)

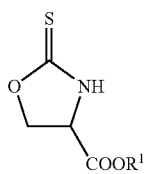
(I)

wherein R$^1$ represents a methyl group;

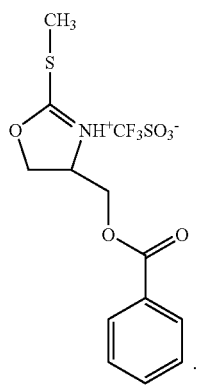
(II)

2. The method according to claim 1, wherein said polymerization is carried out at a temperature between room temperature and 40° C.

3. The method according to claim 1, wherein said polymerization is carried out in the presence of a polar solvent.

4. The method according to claim 1, wherein said polymerization is carried out in the presence of dichloromethane.

5. The method according to claim 1, wherein said polymerization is carried out in an aqueous mixture of a polar organic solvent with water.

6. The method according to claim 1, wherein a yield of said polymerization is at least 90%.

7. The method according to claim 1, wherein said polythiourethane has a molecular weight distribution M$_w$/M$_n$ of from 1.0 to 1.2.

8. The method according to claim 1, wherein said compound of formula (I) is chiral.

9. The method according to claim 1, wherein said polythiourethane is chiral.

10. A method for producing a polythiourethane, comprising:
polymerizing a compound represented by formula (I) in the presence of a compound represented by formula (III)

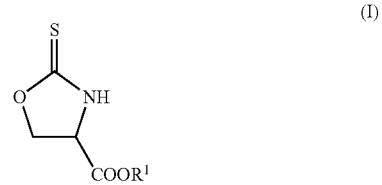
(I)

wherein R$^1$ represents a methyl group;

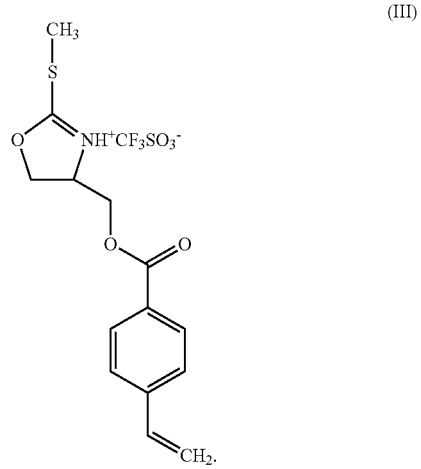
(III)

11. The method according to claim 10, wherein said polymerization is carried out at a temperature between room temperature and 40° C.

12. The method according to claim 10, wherein said polymerization is carried out in the presence of a polar solvent.

13. The method according to claim 10, wherein said polymerization is carried out in the presence of dichloromethane.

14. The method according to claim 10, wherein said polythiourethane has a molecular weight distribution M$_w$/M$_n$ of from 1.0 to 1.2.

15. The method according to claim 10, wherein said compound of formula (I) is chiral.

16. The method according to claim 10, wherein said polythiourethane is chiral.

17. The method of claim 10 further comprising grafting the polythiourethane with a vinyl aromatic compound.

* * * * *